US010069565B2

(12) United States Patent
Gallagher et al.

(10) Patent No.: US 10,069,565 B2
(45) Date of Patent: Sep. 4, 2018

(54) SATELLITE SYSTEM USING OPTICAL GATEWAYS AND ONBOARD PROCESSING

(71) Applicant: Space Systems/Loral, LLC, Palo Alto, CA (US)

(72) Inventors: Vijaya Gallagher, Palo Alto, CA (US); Ghislain Turgeon, San Jose, CA (US)

(73) Assignee: SPACE SYSTEMS/LORAL, LLC, Palo Alto, CA (US)

( * ) Notice: Subject to any disclaimer, the term of this patent is extended or adjusted under 35 U.S.C. 154(b) by 0 days.

(21) Appl. No.: 15/599,852

(22) Filed: May 19, 2017

(65) Prior Publication Data

US 2018/0041275 A1 Feb. 8, 2018

Related U.S. Application Data

(60) Provisional application No. 62/370,645, filed on Aug. 3, 2016.

(51) Int. Cl.
*H04B 10/00* (2013.01)
*H04B 10/118* (2013.01)
(Continued)

(52) U.S. Cl.
CPC ....... *H04B 10/118* (2013.01); *H04B 7/18517* (2013.01); *H04B 10/5161* (2013.01);
(Continued)

(58) Field of Classification Search
CPC .............. H04B 10/118; H04B 10/5161; H04B 2210/006; H04B 7/18517; H04B 10/801;
(Continued)

(56) References Cited

U.S. PATENT DOCUMENTS 5,966,371 A 10/1999 Sherman
6,317,583 B1 11/2001 Wolcott et al.
(Continued)

OTHER PUBLICATIONS

Office Action dated Dec. 14, 2017, in U.S. Appl. No. 15/394,512, filed Dec. 29, 2016.
(Continued)

*Primary Examiner* — M. R. Sedighian
(74) *Attorney, Agent, or Firm* — Vierra Magen Marcus LLP

(57) ABSTRACT

Described herein are ground based subsystems, and related methods, for use in transmitting an optical feeder uplink beam to a satellite that is configured to receive the optical feeder uplink beam and in dependence thereon produce and transmit a plurality of RF service downlink beams within a specified RF frequency range to service terminals. Also described herein are space based subsystems of a satellite, and related methods, for use in transmitting a plurality of RF service downlink beams within a specified RF frequency range to service terminals. Beneficially certain embodiments eliminate the satellite to perform any RF frequency conversions upstream of a channelizer of the space based forward link subsystem on the satellite. Also described herein is space segment return link equipment, and related methods, for use in transmitting an optical feeder downlink beam to a ground based subsystem, as well as ground based return link equipment thereof.

20 Claims, 10 Drawing Sheets

(51) Int. Cl.
  *H04J 14/02* (2006.01)
  *H04B 7/185* (2006.01)
  *H04B 10/516* (2013.01)
  *H04Q 11/00* (2006.01)

(52) U.S. Cl.
  CPC ...... *H04J 14/0221* (2013.01); *H04Q 11/0005* (2013.01); *H04B 2210/006* (2013.01); *H04Q 2011/0016* (2013.01)

(58) Field of Classification Search
  CPC ............ H04B 10/1121; H04B 7/18504; H04B 7/185; H04J 14/0221; H04Q 11/0005; H04Q 2011/0016
  USPC .......................................... 398/49, 121, 125
  See application file for complete search history.

(56) References Cited

U.S. PATENT DOCUMENTS

| | | | |
|---|---|---|---|
| 8,135,338 | B1 | 3/2012 | Gelon et al. |
| 9,742,488 | B2 * | 8/2017 | Ling ................. H04B 7/18526 |
| 2005/0100339 | A1 | 5/2005 | Tegge, Jr. |
| 2009/0202254 | A1 | 8/2009 | Majumdar et al. |
| 2012/0328298 | A1 | 12/2012 | Yi et al. |
| 2014/0092804 | A1 | 4/2014 | Scott |
| 2014/0119385 | A1 | 5/2014 | Hoffmeyer et al. |
| 2014/0362875 | A1 * | 12/2014 | Le Kernec ........... H04B 10/112 370/535 |
| 2016/0204866 | A1 * | 7/2016 | Boroson ............ H04B 10/1121 398/97 |
| 2017/0041065 | A1 | 2/2017 | Goettle, Jr. et al. |
| 2017/0214462 | A1 | 7/2017 | Busche et al. |
| 2017/0366262 | A1 | 12/2017 | Turgeon et al. |
| 2017/0366263 | A1 | 12/2017 | Turgeon et al. |

OTHER PUBLICATIONS

Amendment dated Jan. 5, 2018, in U.S. Appl. No. 15/394,512, filed Dec. 29, 2016.

Mato-Calvo et al., "Optical Feeder Links for Very High Throughput Satellites—System Perspectives", Proceedings of the Ka and Broadband Communications, Navigation and Earth Observation Conference 2015, Ka Conference 2015, Oct. 12-14, 2015, Bologna, Italy.

* cited by examiner

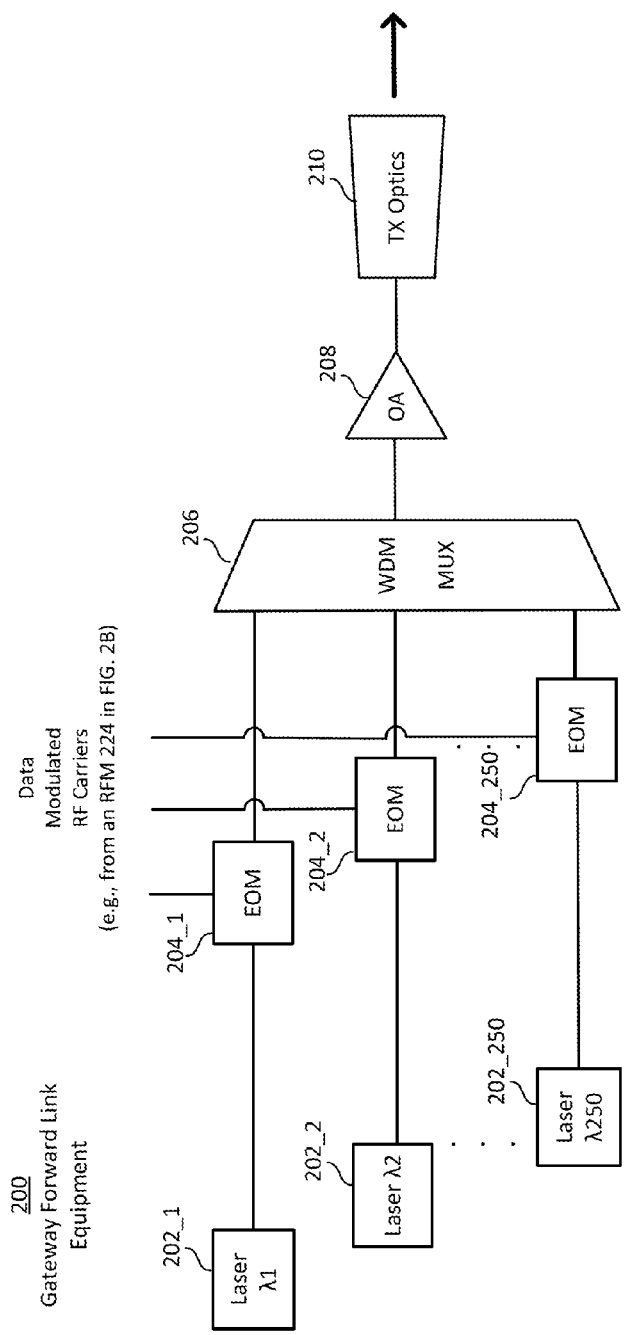
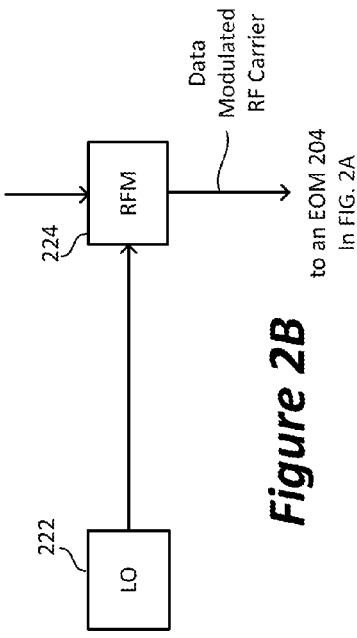
Figure 2A
Figure 2B

SATELLITE SYSTEM USING OPTICAL GATEWAYS AND ONBOARD PROCESSING

PRIORITY CLAIM

This application claims priority to U.S. Provisional Patent Application No. 62/370,645, filed Aug. 8, 2016, which is incorporated herein by reference in its entirety.

BACKGROUND

There is increasing need for large amounts of bandwidth to be routed between a ground based gateway and a spaced based satellite. With the recent announcement of planned Ka band and Ku band satellite constellations, it would be beneficial if such frequency band satellite constellations can be used to help satisfy the aforementioned increasing need for large amounts of bandwidth to be routed between a ground based gateway and a spaced based satellite.

BRIEF DESCRIPTION OF THE DRAWINGS

FIG. 2A depicts gateway forward link equipment, according to an embodiment of the present technology.

FIG. 2B depicts components that can be used to produce data modulated RF carriers introduced in FIG. 2A, according to an embodiment of the present technology.

DETAILED DESCRIPTION

Certain embodiments of the present technology described herein relate to system and subsystem architectures for high throughput satellites (HTS), very high throughput satellites (VHTS) and very very high throughput satellites (VVHTS), which is also known as ultra high throughput satellites (UHTS), all of which can be collectively referred to as HTS. Because of spectrum availability, if feeder links between gateway (GW) sites and satellites are at optical frequencies, then the number of GW sites can be drastically reduced compared to if the feeder links are at RF frequencies, which leads to significant cost savings in the space and ground segments. Even with the availability of 5 GHz spectrum at V band and dual polarization, a satellite with Terabit/sec (Tb/s) capacity would need between 40 and 70 GWs using RF feeder links, depending on the spectral efficiency achieved, as described in a conference paper titled "Optical Feederlinks for VHTS-System Perspectives", by Mata-Calvo et al. (Conference: Proceedings of the Ka and Broadband Communications, Navigation and Earth Observation Conference 2015. Ka Conference 2015, 12-14 Oct. 2015, Bologna, Italy). In contrast, using optical feeder links can reduce the total active GW count to one (plus a few sites would be added for diversity and redundancy; but note that V/Q band or Ka band GWs typically also need diversity and redundancy sites to achieve high availability).

Prior to describing details of specific embodiments of the present technology, it is first useful to describe an exemplary wireless communication system with which embodiments of the present technology would be useful. An example of such a wireless communication system will now be described with reference to FIG. 1.

Figure 1:
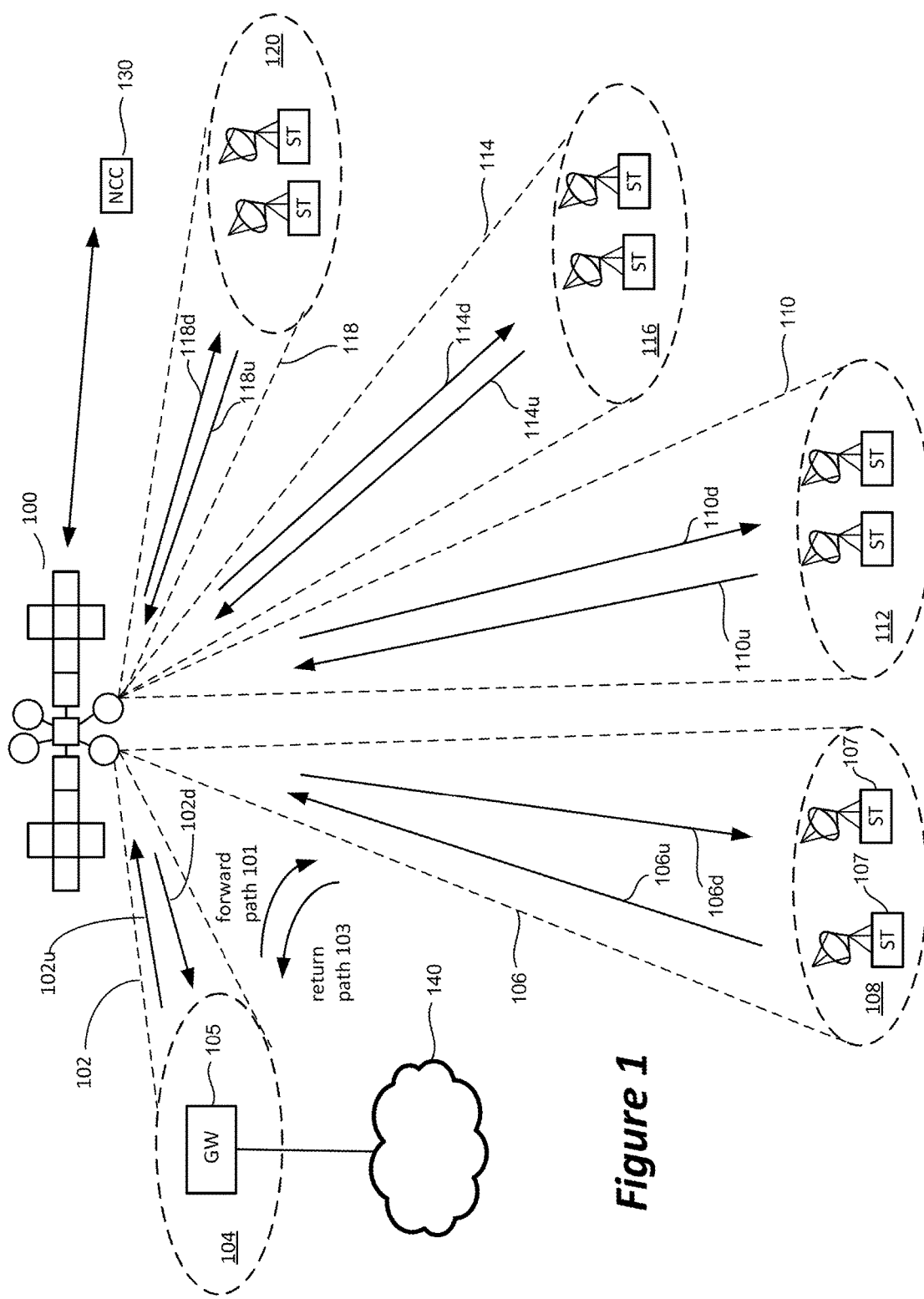
FIG. 1 is a block diagram describing a wireless communication system, which may be a satellite communication system.

FIG. 1 depicts a block diagram of a wireless communications system that includes a communication platform 100, which may be a satellite located, for example, at a geostationary or non-geostationary orbital location. In other embodiments, other platforms may be used such as an unmanned aerial vehicle (UAV) or balloon, or even a ship for submerged subscribers. In yet another embodiment, the subscribers may be air vehicles and the platform may be a ship or a truck where the "uplink" and "downlink" in the following paragraphs are reversed in geometric relations. Platform 100 may be communicatively coupled to at least one gateway (GW) 105 and a plurality of subscriber terminals ST (including subscriber terminals 107). The term subscriber terminals may be used to refer to a single subscriber terminal or multiple subscriber terminals. A subscriber terminal ST is adapted for communication with the wireless communication platform 100, which as noted above, may be a satellite. Subscriber terminals may include fixed and mobile subscriber terminals including, but not limited to, a cellular telephone, a wireless handset, a wireless modem, a data transceiver, a paging or position determination receiver, or mobile radio-telephone, or a headend of an isolated local network. A subscriber terminal may be handheld, portable (including vehicle-mounted installations for cars, trucks, boats, trains, planes, etc.) or fixed as desired. A subscriber terminal may be referred to as a wireless communication device, a mobile station, a mobile wireless unit, a user, a subscriber, or a mobile. Where the communication platform of a wireless communication system is a satellite, the wireless communication system can be referred to more specifically as a satellite communication system. For the remainder of this description, unless stated otherwise, it is assumed that the communication platform 100 is a satellite. Accordingly, platform 100 will often be referred to as satellite 100, and the wireless communication system will often be referred to as a satellite communication system.

In one embodiment, satellite 100 comprises a bus (e.g., spacecraft) and one or more payloads (e.g., the communication payload). The satellite will also include multiple power sources, such as batteries, solar panels, and one or more propulsion systems, for operating the bus and the payload.

The at least one gateway 105 may be coupled to a network 140 such as, for example, the Internet, terrestrial public switched telephone network, mobile telephone network, or a private server network, etc. Gateway 105 and the satellite (or platform) 100 communicate over a feeder beam 102, which has both a feeder uplink 102u and a feeder downlink 102d. In one embodiment, feeder beam 102 is a spot beam to illuminate a region 104 on the Earth's surface (or another surface). Gateway 105 is located in region 104 and communicates with satellite 100 via feeder beam 102. Although a single gateway is shown, some implementations will include many gateways, such as five, ten, or more. One embodiment includes only one gateway. Each gateway may utilize its own feeder beam, although more than one gateway can be positioned within a feeder beam. In one embodiment, a gateway is located in the same spot beam as one or more subscriber terminals.

Subscriber terminals ST and satellite 100 communicate over service beams, which are also known as user beams. For example, FIG. 1 shows service beams 106, 110, 114 and 118 for illuminating regions 108, 112, 116 and 120, respectively. In many embodiments, the communication system will include more than four service beams (e.g., sixty, one hundred, etc.). Each of the service beams have an uplink (106u, 110u, 114u, 118u) and a downlink (106d, 110d, 114d, 118d) for communication between subscriber terminals ST and satellite 100. Although FIG. 1 only shows two subscriber terminals within each region 108, 112, 116 and 120, a typical system may have thousands of subscriber terminals within each region.

In one embodiment, communication within the system of FIG. 1 follows a nominal roundtrip direction whereby data is received by gateway 105 from network 140 (e.g., the Internet) and transmitted over the forward path 101 to a set of subscriber terminals ST. In one example, communication over the forward path 101 comprises transmitting the data from gateway 105 to satellite 100 via uplink 102u of feeder beam 102, through a first signal path on satellite 100, and from satellite 100 to one or more subscriber terminals ST via downlink 106d of service beam 106. An uplink (e.g., 102u) of a feeder beam (e.g., 102) can also be referred to more succinctly as a feeder uplink beam, and the downlink (e.g., 106d) of a service beam (e.g., a 106) can also be referred to more succinctly as a service downlink beam. Although the above example mentions service beam 106, the example could have used other service beams.

Data can also be sent from the subscriber terminals STs over the return path 103 to gateway 105. In one example, communication over the return path comprises transmitting the data from a subscriber terminal (e.g., subscriber terminal 107 in service beam 106) to satellite 100 via uplink 106u of service beam 106, through a second signal path on satellite 100, and from satellite 100 to gateway 105 via downlink 102d of feeder beam 102. An uplink (e.g., 106u) of a service beam (e.g., 106) can also be referred to more succinctly as a service uplink beam, and the downlink 102d of feeder beam 102 can also be referred to more succinctly as a feeder downlink beam. Although the above example uses service beam 106, the example could have used any service beam.

FIG. 1 also shows a Network Control Center (NCC) 130, which can include an antenna and modem for communicating with satellite 100, as well as one or more processors and data storage units. Network Control Center 130 provides commands to control and operate satellite 100. Network Control Center 130 may also provide commands to any of the gateways and/or subscriber terminals.

In one embodiment, communication platform 100 implements the technology described below. In other embodiments, the technology described below is implemented on a different platform (or different type of satellite) in a different communication system. For examples, the communication platform can alternatively be a UAV or balloon, but is not limited thereto.

The architecture of FIG. 1 is provided by way of example and not limitation. Embodiments of the disclosed technology may be practiced using numerous alternative implementations.

Conventionally, a gateway (e.g., gateway 105) communicates with a satellite (e.g., satellite 100) using an antenna on the ground that transmits and receives RF (radiofrequency) signals to and from an antenna on the satellite. Certain embodiments of the present technology utilize optical components instead of antennas to transmit and receive optical signals between a gateway and a satellite, as will be described in additional details below.

Block diagrams for the communications subsystems for the ground and space segments, according to certain embodiments of the present technology, are described below with reference to FIGS. 2A, 2B, 3A, 3B, 4A, 4B, 4C, and 5. Certain embodiments are for use with a satellite that includes an onboard channelizer that is used for onboard processing.

Figure 3A:
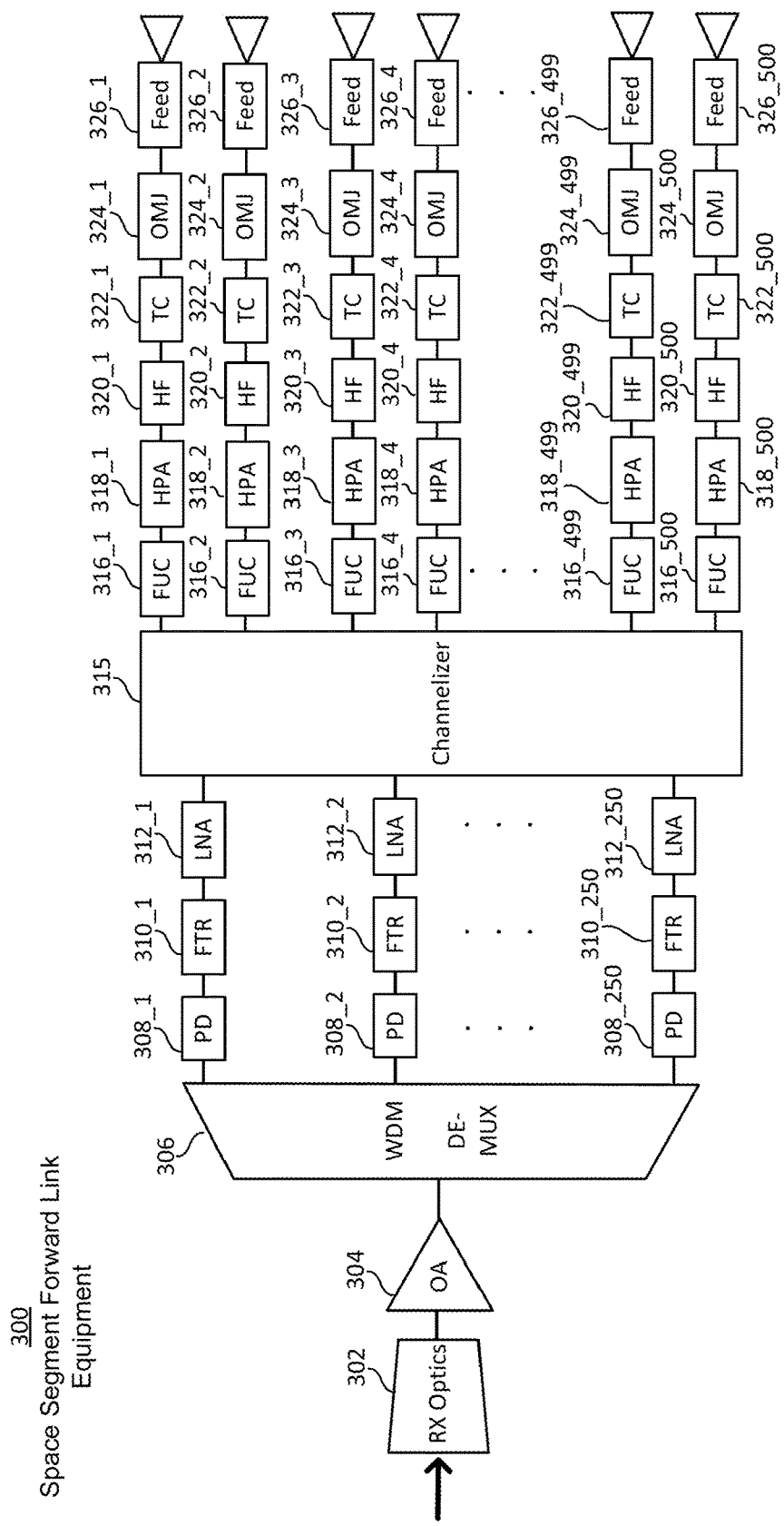
FIG. 3A depicts space segment forward link equipment, according to an embodiment of the present technology.
Figure 3B:
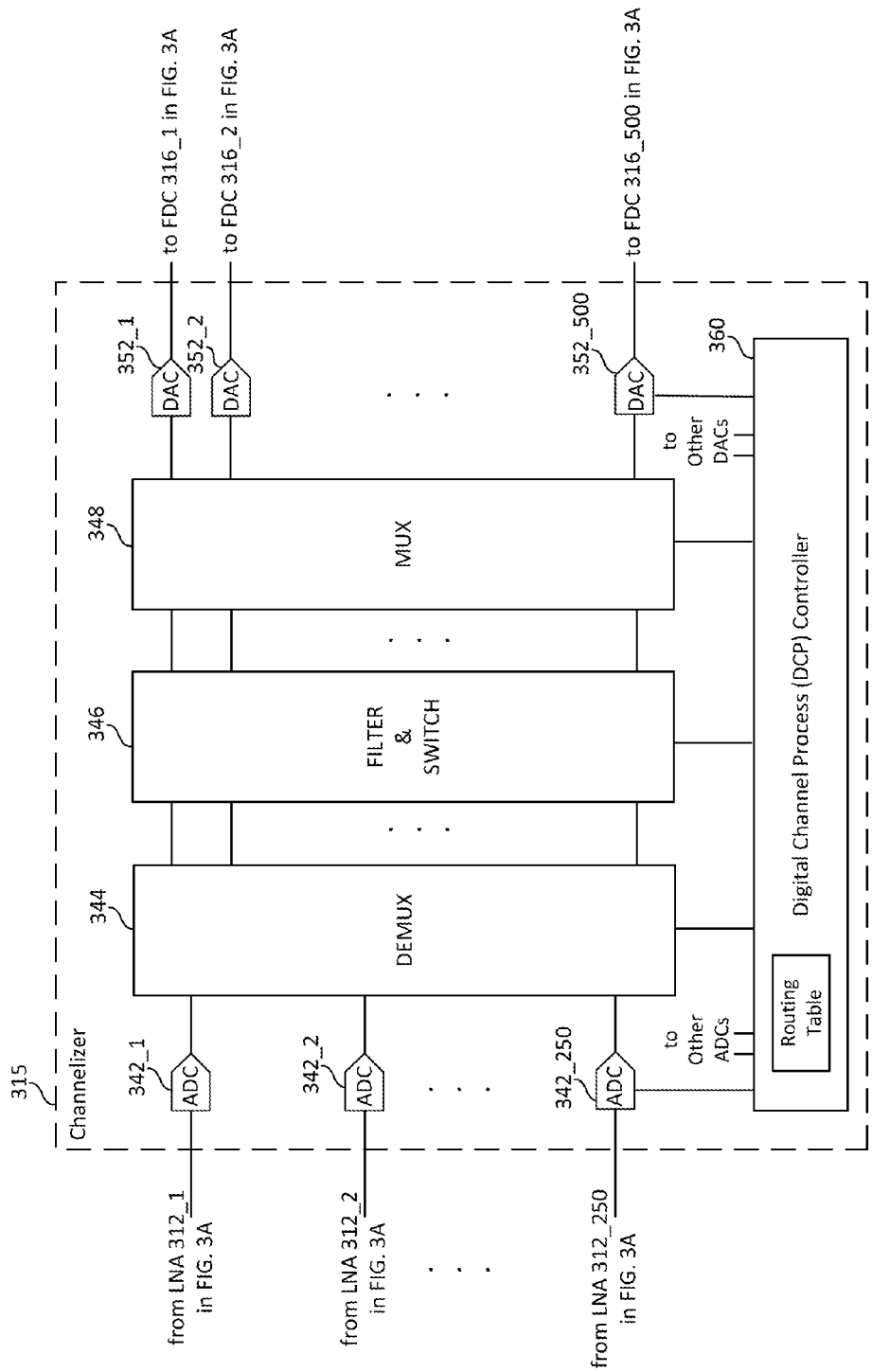
FIG. 3B depicts details of the forward link channelizer of the space segment forward link equipment introduced in FIG. 3A, according to an embodiment of the present technology.

FIGS. 2A and 2B will first be used to describe gateway forward link equipment according to certain embodiments of the present technology. FIGS. 3A and 3B will then be used to describe space segment forward link equipment according to an embodiment of the present technology. In specific embodiments, 250 laser wavelengths are combined at a single gateway (which can be referred to as an optical gateway) and sent to the satellite, which has 500 user beams (also known as service beams) operating at Ka band frequencies. FIGS. 4A, 4B, 4C, and 5 will thereafter be used to depict return link equipment for a satellite and a gateway.

Gateway Forward Link Equipment

FIG. 2A will now be used to describe gateway forward link equipment 200, according to an embodiment of the present technology. Such gateway forward link equipment 200 can also be referred to as an optical gateway forward link subsystem 200, or more generally, as an optical communication subsystem. Referring to FIG. 2A, the optical gateway forward link subsystem 200 is shown as including two hundred and fifty lasers 202_1 to 202_250, two hundred and fifty electro-optical modulator (EOMs) 204_1 to 204_250, a wavelength-division multiplexing (WDM) multiplexer (MUX) 206, an optical amplifier (OA) 208 and transmitter optics 210. Each of these elements are described below.

The two hundred and fifty separate lasers 202_1 to 202_250 each emit light of a different wavelength within a specified wavelength range that is for use in producing the optical feeder uplink beam (e.g., 102u). The lasers can be referred to individually as a laser 202, or collectively as the lasers 202. Where the specified wavelength range is, for example, from 1510 nanometers (nm) to 1560 nm, then the laser 202_1 may emit light having a peak wavelength of 1510 nm, the laser 202_2 may emit light having a peak wavelength of 1510.2 nm, the laser 202_3 (not shown) may emit light having a peak wavelength of 1510.4 nm, . . . the laser 202_249 (not shown) may emit light having a peak wavelength of 1559.8 nm, and the laser 202_250 may emit light having a peak wavelength of 1660 nm. In other words, the peak wavelengths emitted by the lasers 202 can occur at 0.2 nm intervals from 1510 nm to 1560 nm. The wavelength range from 1510 nm to 1560 nm, which is within the infrared (IR) spectrum, is practical to use because IR lasers for use in communications are readily available. However, wider or narrow wavelength ranges, within the same or other parts of the optical spectrum, may alternatively be used. For example, it would also be possible to utilize a wavelength range within the 400 nm-700 nm visible spectrum. It is also possible that the wavelength range that is specified for use in producing the optical feeder uplink beam (e.g., 102u) is non-contiguous. For example, the wavelength range that is for use in producing the optical feeder uplink beam can be from 1510 nm to 1534.8 nm and from 1540.2 nm to 1564.8 nm. Further, it is also possible that gateway forward link equipment can alternatively include more or less than two hundred and fifty lasers (that each emit light of a different peak wavelength within a specified contiguous or non-contiguous wavelength range). Additionally, it is noted that the gateway forward link equipment may include two or more of each of the lasers (that each emit light of a different peak wavelength within a specified contiguous or non-contiguous wavelength range) to provide for redundancy or backup. Each of the lasers 202 can be, for example, a diode-pumped infrared neodymium laser, although the use of other types of lasers are also within the scope of the embodiments described herein.

To reduce and preferably avoid interference, the wavelength range that is for use in producing the optical feeder uplink beam (e.g., 102u) should be different than the wavelength range that is for use in producing the optical feeder downlink beam (e.g., 102d). For example, if the wavelength range that is for use in producing the optical feeder uplink beam 102u is from 1510 nm to 1560 nm, then the wavelength range that is for use in producing the optical feeder downlink beam 102d can be from 1560.2 nm to 1575 nm. For another example, if the wavelength range that is for use in producing the optical feeder uplink beam 102u is from 1510 nm to 1534.8 nm and from 1540.2 nm to 1564.8 nm, then the wavelength range that is for use in producing the optical feeder downlink beam 102d can be from 1535 nm to 1540 nm and from 1565 nm to 1575 nm. These are just a few examples, which are not intended to be all encompassing. Details of how an optical feeder downlink beam (e.g., 102d) can be produced in accordance with an embodiment of the present technology are provided below in the discussion of FIGS. 4A, 4B and 4C.

Still referring to FIG. 2A, the light emitted by each of the two hundred and fifty lasers 202, which can be referred to as an optical carrier signal, is provided (e.g., via a respective optical fiber) to a respective one of the two hundred and fifty separate EOMs 204_1 to 204_250. The EOMs can be referred to individually as an EOM 204, or collectively as the EOMs 204. Each of the EOMs is an optical device in which a signal-controlled element exhibiting an electro-optic effect is used to modulate a respective beam of light. The modulation performed by the EOMs 204 may be imposed on the phase, frequency, amplitude, or polarization of a beam of light, or any combination thereof. In accordance with a specific embodiment, each of the EOMs 204 is a phase modulating EOM that is used as an amplitude modulator by using a Mach-Zehnder interferometer. In other words, each of the EOMs 204 can be implemented as a Mach-Zehnder modulator (MZM), which can be a Lithium Niobate Mach-Zehnder modulator, but is not limited thereto. In accordance with specific embodiments, each of the EOMs 204 is implemented as an MZM that produces an amplitude modulated (AM) optical waveform with a modulation index between 10% and 80% in order to maintain fidelity of an RF waveform (modulated therein) without too much distortion. The optical signal that is output by each of the EOMs 204 can be referred to as an optical data signal. The modulation scheme that is implemented by the EOMs 204 can result in double- or vestigial-sidebands, including both an upper sideband (USB) and a lower sideband (LSB). Alternatively single-sideband modulation (SSB) can be utilized to increase bandwidth and transmission power efficiency.

The two hundred and fifty separate optical data signals that are output by the two hundred and fifty EOMs 204 are provided to the WDM MUX 206, which can also be referred to as a dense wavelength division multiplexing (DWDM) MUX. The WMD MUX 206 multiplexes (i.e., combines) the two hundred and fifty optical data signals, received from the two hundred and fifty EOMs 204, onto a single optical fiber, with each of the two hundred and fifty separate optical data signals being carried at the same time on its own separate optical wavelength within the range from 1510 nm to 1560 nm. For example, as explained above, the two hundred and fifty separate optical data signals can have peak wavelengths of 1510 nm, 1510.2 nm, 1510.4 nm . . . 1559.8 nm and 1560 nm.

The signal that is output by the WMD MUX 206, which can be referred to as a wavelength division multiplexed optical signal, is provided to the optical amplifier (OA) 208. The OA 208 amplifies the wavelength division multiplexed optical signal so that the wavelength division multiplexed optical signal has sufficient power to enable transmission thereof from the ground to the satellite 100 in space. An exemplary type of OA 208 that can be used is an erbium-doped fiber amplifier (EDFA). However embodiments of the present technology are not limited to use with an EDFA. The output of the OA 208 can be referred to as an optically amplified wavelength division multiplexed optical signal.

The optically amplified wavelength division multiplexed optical signal, which is output by the OA 208, is provided (e.g., via an optical fiber) to the transmitter optics 210. The transmitter optics 210, which can also be referred to as a telescope, can includes optical elements such as lenses, mirrors, reflectors, filters and/or the like. The transmitter optics 210 outputs a collimated optical feeder uplink beam that is aimed at a satellite. A gimbal, and/or the like, can be used to control the steering of the transmitter optics 210. In accordance with an embodiment, the collimated optical feeder uplink beam has an aperture of about 100 cm, and a half beam divergence of about 0.0000004 radians, wherein the term "about" as used herein means +/−10 percent of a specified value. The use of other apertures and half beam divergence values are also within the scope of the embodiments described herein. The collimated optical feeder uplink beam, which is output by the transmitter optics 210, is transmitted in free-space to receiver optics on a satellite. The term "free-space" means air, outer space, vacuum, or something similar (which is in contrast to using solids such as optical fiber cable, an optical waveguide or an optical transmission line). Reception and processing of the optical feeder uplink beam received at the satellite will be described in additional detail below. However, before describing the reception and processing of the optical feeder uplink beam received at the satellite, additional details of the gateway forward link equipment, according to certain embodiments of the present technology, will first be provided.

Referring again to the EOMs 204, in accordance with certain embodiments of the present technology, each of the EOMs 204 modulates the optical signal it receives (e.g., via an optical fiber from a respective laser 202) with a separate RF signal that has already been modulated to include user data. As will be described in additional detail below, e.g., with reference to FIGS. 3A and 3B, in accordance with certain embodiments of the present technology, forward link equipment of a satellite (to which the transmitter optics 210 send the optical feeder uplink beam) includes a forward link channelizer (e.g., 315 in FIGS. 3A and 3B) that operates within an intermediate RF frequency range that is lower than the service downlink RF frequency range within which the satellite(s) transmit RF service downlink beams to service terminals STs. In accordance with certain embodiments of the present technology, the RF frequencies of the optical data signals output by the EOMs 204 are within the same intermediate RF frequency range within which the forward link channelizer (e.g., 315 in FIGS. 3A and 3B) on the satellite(s) is/are configured to operate. This beneficially eliminates of any need for the space segment forward link subsystem of the satellite to perform any RF frequency conversions upstream of the forward link channelizer on the satellite. More specifically, such embodiments eliminate the need for RF frequency down-converters in the portion of the forward link equipment onboard the satellite that is upstream of the forward link channelizer on the satellite. This benefit is achieved by utilizing appropriate carrier frequencies in gateway forward link equipment. More specifically, the carrier frequencies of the RF signals that are used to modulate each of the two hundred and fifty lasers 202 on the ground (e.g., in gateway 105) correspond to the desired intermediate RF frequency range at which the forward link channelizer on the satellite operates. An exemplary intermediate RF frequency range at which the foward link channelizer on the satellite operates is from 1.5 GHz to 2.0 GHz. As a result, the space based forward link subsystem on the satellite is greatly simplified compared to if RF frequency down-converters were included in the portion of the forward link equipment onboard the satellite that is upstream of the forward link channelizer on the satellite. Reasons why such a channelizer may be limited to operating within an intermediate RF frequency range may relate to limitations on how fast ADCs and other circuitry within the channelizer can be designed and built to operate. It is noted that it is also possible that a forward link channelizer on a satellite operate at alternative intermediate RF frequency ranges (besides from 1.5 to 2.0 GHz) that are lower than the service downlink RF frequency range within which the satellite(s) transmit RF service downlink beams to service terminals STs. In other words, a channelizer is not limited to operating within an intermediate RF frequency range of 1.5 to 2.0 GHz, and more specifically, may operate at higher frequency bands as technology improves and the a desired frequency of RF bands increases.

As noted above, an exemplary intermediate RF frequency range at which the forward link channelizer on the satellite operates can be from 1.5 GHz to 2.0 GHz. In such a case, each of the EOMs 204 could modulate the optical signal it receives (e.g., via an optical fiber from a respective laser 202) with a separate RF signal having a frequency within the range from 1.5 GHz to 2.0 GHz. Further, since each of the two hundred and fifty optical data signals (produced by the two hundred and fifty EOMs) has a bandwidth of 0.5 GHz, the bandwidth of the optical feeder uplink beam that is sent from the ground to the satellite is 125 GHz (i.e., 0.5 GHz*250=125 GHz). As noted above, a channelizer is not limited to operating within an intermediate RF frequency range of 1.5 to 2.0 GHz, and more specifically, may operate at higher frequency bands as technology improves and the a desired frequency of RF bands increases.

FIG. 2B depicts components that can be used to produce one of the data modulated RF carriers introduced in FIG. 2A, according to an embodiment of the present technology. Referring to FIG. 2B, shown therein is a local oscillator (LO) 222 that produces an RF carrier signal within the intermediate RF frequency range at which the forward link channelizer on the satellite operates. For example, the LO 222 may produce an RF carrier within the intermediate RF frequency range from 1.5 to 2.0 GHz. The RF carrier signal that is output by the LO 222 is provided to an RF modulator (RFM) 224, which also receives a data signal. The RFM 224 modulates that data signal onto the RF carrier signal to produce a data modulated RF carrier signal, which is provided to one of the EOMs 204 shown in FIG. 2A. Where two hundred and fifty data modulated RF carrier signals are produced (each of which is provided to a different one of the EOMs 204), the components shown in FIG. 2B can be duplicated two hundred and fifty times. Alternatively, the two hundred and fifty RFMs 224 can receive the same carrier signal from a common LO 222, with each of the RFMs 224 receiving a separate data signal.

The RFMs 224 can perform various different types of RF modulation, depending upon implementation and other factors such channel conditions. For example, the RFMs 224 can perform Amplitude-shift keying (ASK), Phase-shift keying (PSK), or Amplitude and phase-shift keying (APSK) types of modulation (e.g., 16-, 128- or 256-APSK), just to name a few. In accordance with certain embodiments, the modulation scheme performed by the RFMs 224 and EOMs 204 cause the signals that are transmitted from the ground to a satellite to be in conformance with the Digital Video Broadcasting-Satellite-Second Generation (DVB-S2) standard, or the related DVB-S2X standard (which is an extension of the DVB-S2 standard).

Referring again to FIG. 2A, in order to wavelength division multiplex two hundred and fifty wavelengths produced by the two hundred and fifty lasers 202_1 to 202_250, a combination of C band optical frequencies (from 1530 nm to 1565 nm) and L band optical frequencies (from 1565 nm to 1625 nm) may be used, in order to keep the separation of the wavelengths to be at least 20-25 GHz in order to reduce and preferably minimize inter-wavelength interference that may occur in an optical fiber due to non-linearities. If fewer wavelengths are used (e.g., at C band alone), and higher bandwidth is available at Ka band per user beam (e.g., if 2.9 GHz is available as it is in certain ITU Regions), the overall throughput can still remain of the order of one to several hundred GHz, which lets the capacity reach the Tb/s range.

Space Segment Forward Link Equipment

FIGS. 3A and 3B will now be used to describe space segment forward link equipment 300 according to an embodiment of the present technology. Such space segment forward link equipment 300, which can also be referred to as a forward link satellite subsystem 300, or more generally, as an optical communication subsystem, is configured to receive the optical signal that is transmitted from the ground based optical gateway subsystem 200 to the satellite that is carrying the space segment forward link equipment 300. The space segment forward link equipment 300 is also configured to convert the optical signal that it receives (from the ground based optical gateway subsystem 200) into electrical signals, and to produce service beams therefrom, wherein the service beams are for transmission from the satellite to service terminals STs.

Referring to FIG. 3A, the forward link satellite subsystem 300 is shown as including receiver optics 302, an optical amplifier (OA) 304, a wavelength-division multiplexing (WDM) demultiplexer (DEMUX) 306, two hundred and fifty photodetectors (PDs) 308_1 to 308_250, two hundred and fifty filters 310_1 to 310_250, two hundred and fifty low noise amplifiers (LNAs) 312_1 to 312_250, and a channelizer 315. The forward link satellite subsystem 300 is also shown as including five hundred frequency up converters (FUCs) 316_1 to 316_500, high power amplifiers (HPAs) 318_1 to 318_500, harmonic filters (HFs) 320_1 to 320_500, test couplers (TCs) 322_1 to 322_500, orthomode junctions (OMJs) 324_1 to 324_500, and feed horns 326_1 to 326_500. The PDs 308_1 to 308_250 can be referred to individually as a PD 308, or collectively as the PDs 308. The filters 310_1 to 310_250 can be referred to individually as a filter 310, or collectively as the filters 310. The LNAs 312_1 to 312_250 can be referred to individually as an LNA 312, or collectively as the LNAs 312. The channelizer 315 can also be referred to more specifically as a forward link channelizer 315, since it is part of the space segment forward link equipment 300. The frequency up converters (FUCs) 316_1 to 316_500 can be referred to individually as a frequency up converter (FUC) 316, or collectively as the frequency up converters (FUCs) 316. The HPAs 318_1 to 318_500 can be referred to individually as an HPA 318, or collectively as the HPAs 318. The HFs 320_1 to 320_500 can be referred to individually as an HF 320, or collectively as the HFs 320. The TCs 322_1 to 322_500 can be referred to individually as a TC 322, or collectively as the TCs 322. The OMJs 324_1 to 324_500 can be referred to individually as an OMJ 324, or collectively as the OMJs 324. The feed horns 326_1 to 326_500 can be referred to individually as a feed horn 326, or collectively as the feed horns 326.

The receiver optics 302, which can also be referred to as a telescope, can include optical elements such as mirrors, reflectors, filters and/or the like. The receiver optics 302 receives the optical feeder uplink beam that is transmitted through free-space to the satellite by the ground based optical gateway forward link subsystem 200, and provides the received optical feeder uplink beam (e.g., via an optical fiber) to the OA 304. A gimbal, and/or the like, can be used to control the steering of the receiver optics 302. When the optical feeder uplink beam reaches the satellite, the power of the optical feeder uplink beam is significantly attenuated compared to when it was transmitted by the ground based optical gateway subsystem 200. Accordingly, the OA 304 is used to amplify the received optical feeder uplink beam before it is provided to the WDM DEMUX 306. The OA 304 can be, e.g., an erbium-doped fiber amplifier (EDFA), but is not limited thereto. The output of the OA 304 can be referred to as an optically amplified received optical feeder uplink beam. The WDM DEMUX 306 demultiplexes (i.e., separates) the received optical feeder uplink beam (after it has been optically amplified) into two hundred and fifty separate optical signals, each of which is provided to a separate photodetector (PD) 308. Each PD 308 converts the optical signal it receives from the WDM DEMUX 306 to a respective RF electrical signal. The RF electrical signal produced by each PD 308 is provided to a respective filter (FTR) 310 (e.g., a bandpass filter) to remove unwanted frequency components and/or enhance desired frequency components. For an example, each filter 310 can pass frequencies within the range of 1.5 to 2.0 GHz, but are not limited thereto. The filtered RF electrical signal, which is output by each filter 310, is provided to a respective low noise amplifier (LNA) 312. Each LNA 312 amplifies the relatively low-power RF signal it receives from a respective filter 310 without significantly degrading the signals signal-to-noise ratio. The amplified RF signal that is output by each LNA 312 is provided to input ports of the forward link channelizer 315. Exemplary details of the forward link channelizer 315 are described below with reference to FIG. 3B. In an exemplary embodiment shown in FIG. 3A, the forward link channelizer 315 includes two hundred and fifty input ports and five hundred output ports.

As noted above, the forward link channelizer 315 is configured to operate within an intermediate RF frequency range (e.g., 1.5 to 2.0 GHz, but not limited thereto) that is lower than the service downlink RF frequency range (e.g., from 17.7 GHz to 20.2 GHz, or from 17.3 GHz to 20.2 GHz, but not limited thereto) within which the satellite transmits RF service downlink beams to service terminals STs. Accordingly, RF signals that are output by the forward link channelizer 315, at the output ports thereof, are provided to the frequency up converters (FUCs) 316 to thereby increase the frequencies of the RF signals (output from the forward link channelizer 315) from the intermediate RF frequency range (e.g., from 1.5 GHz to 2.0 GHz) to the service downlink RF frequency range (e.g., from 17.7 GHz to 20.2 GHz, or from 17.3 GHz to 20.2 GHz, but not limited thereto).

Each HPA 318 amplifies the RF signal it receives so that the RF signal has sufficient power to enable transmission thereof from the satellite 100 in space to an ST, which may be on the ground. Each HPA 318 can be, e.g., a liner traveling wave tube high power amplifier, but is not limited thereto. The signal that is output by each of the HPAs 318 can be referred to as an amplified RF signal. Each HF 320 is used to reduce and preferably remove any distortion in the amplified RF signal that was caused by a respective HPA 318. Each HF 320 can be, e.g., a waveguide cavity filter, but is not limited thereto. Each test coupler TC 322 can be used for power monitoring, payload testing and/or performing calibrations based on signals passing therethrough. Each OMJ 324 adds either right hand circular polarization (RHCP) or left hand circular polarization (LHCP) to the RF signal that is passed through the OMJ. This allows for color reuse frequency band allocation, wherein each color represents a unique combination of a frequency band and an antenna polarization. This way a pair of feeder beams that illuminate adjacent regions can utilize a same RF frequency band, so long as they have orthogonal polarizations. Alternatively, each OMJ 324 adds either horizontal linear polarization or vertical linear polarization to the RF signal that is passed through the OMJ. Each feed horn 326 converts the RF signal it receives, from a respective OMJ 324, to radio waves and feeds them to the rest of the antenna system (not shown) to focus the signal into a service downlink beam. A feed horn 326 and the rest of an antenna can be collectively referred to as the antenna. In other words, an antenna, as the term is used herein, can include a feed horn. All or some of the feed horns 326 can share a common reflector. Such reflector(s) is/are not shown in the Figures, to simply the Figures.

FIG. 3B will now be used to describe details of the forward link channelizer 315, according to an embodiment of the present technology. Referring to FIG. 3B, the forward link channelizer 315 is shown as including two hundred and fifty analog to digital converters (ADCs) 342_1 to 342_250, a demultiplexer 344, filter and switch circuitry 346, a multiplexer 348, five hundred digital to analog converters (DACs) 352_1 to 352_500. The ADCs 342_1 to 342_250 can be referred to individually as an ADC 342, or collectively as the ADCs 342. The DACs 352_1 to 352_500 can be referred to individually as a DAC 352, or collectively as the DACs 352. The forward link channelizer 315 is also shown as including a digital channel process (DCP) controller 360 that controls the ADCs 342, the demultiplexer 344, the filter and switch circuitry 346, the multiplexer 348 and the DACs 352. The DCP controller 360 can store or otherwise access one or more routing table(s) that are used to control the switching that is performed by the filter and switch circuitry 346 and/or operation of the multiplexer 348. The ADCs 342 digitize the analog RF signals provided to the input ports of the forward link channelizer 315 and provides digitized RF signals to the demultiplexer 344. In accordance with certain embodiments, the demultiplexer 344, the filter and switch circuitry 346, and the multiplexer 348, under the control of the DCP controller 360, achieves flexible routing and a high spectral efficiency by changing the frequency and beam allocation in a flexible manner by means of digital signal processing. The demultiplexer 344 decomposes or separates digitized RF signals into independently routable sub-channels or sub-bands. The filter and switch circuitry 346 routes the decomposed sub-channels to beams and frequencies as desired. At the multiplexer 348, the sub-channels that were rearranged by the filter and switch circuitry 346 are multiplexed or combined as desired, provided to the DACs 352, and then provided to the output ports of the forward link channelizer 315. Explained another way, the demultiplexer 344, the filter and switch circuitry 346, and the multiplexer 348, under the control of the DCP controller 360, digitally divides each sub-bands of the digitized RF signals into frequency slices that can be separated, filtered, switched, processed, routed and/or recombined into RF output signals (in output sub-bands) that are converted to analog RF signals by the DACs 352 and output from the forward link channelizer 315. While the exemplary forward link channelizer 315 was shown as and described as including two hundred and fifty input ports and five hundred output ports, the forward link channelizer 315 can have alternative numbers of input ports and output ports. Further, while not specifically shown in FIG. 3B, the forward link channelizer 315 can include analog front end circuitry upstream of the ADCs 342 and/or digital back end circuitry downstream of the DACs 352. The filter and switch circuitry 346 of the forward link channelizer 315 can include, e.g., a crossbar switch, a multiple stage switch network, or another switch structure for routing frequency slices as desired.

Space Segment Return Link Equipment

Figure 4A:
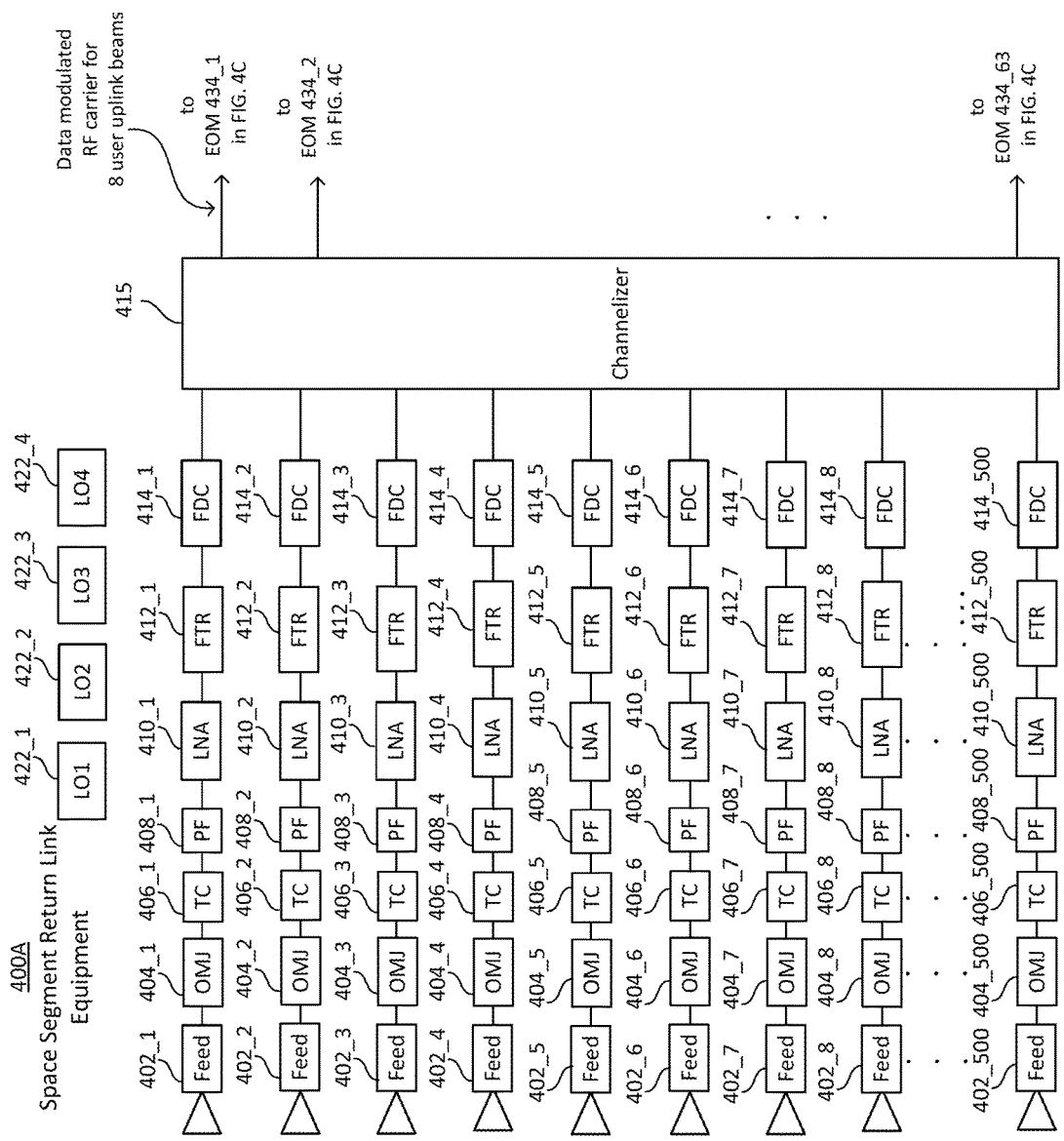
FIGS. 4A depicts a portion of space segment return link equipment, according to an embodiment of the present technology.

FIG. 4A will now be used to describe a portion of space segment return link equipment 400A, according to an embodiment of the present technology. Such space segment return link equipment 400A, which can also be referred to as a satellite return link subsystem 400A, or more generally, as an optical communication subsystem, is configured to receive the RF signals that are transmitted by service terminals STs to the satellite (e.g., 100) that is carrying the space segment return link equipment 400A. The space segment return link equipment 400A, together with the space segment return link equipment 400D in FIG. 4C, is also configured to convert the RF signals that it receives (from the service terminals STs) into optical signals, and to produce optical return feeder beams therefrom, wherein the optical return feeder beams are for transmission from the satellite (e.g., 100) to a ground based gateway (e.g., 105).

Referring to FIG. 4A, the portion of the space segment return link equipment 400A shown therein includes feed horns 402_1 to 402_500 (which can be referred to individually as a feed horn 402, or collectively as the feed horns 402), orthomode junctions (OMJs) 404_1 to 404_500 (which can be referred to individually as an OMJ 404, or collectively as the OMJs 404), test couplers (TCs) 406_1 to 406_500 (which can be referred to individually as a TC 406, or collectively as the TCs 406), pre-select filters (PFs) 408_1 to 408_500 (which can be referred to individually as a PF 408, or collectively as the PFs 408), low noise amplifiers (LNAs) 410_1 to 410_500 (which can be referred to individually as an LNA 410, or collectively as the LNAs 410), and filters 412_1 to 412_500 (which can be referred to individually as a filter 412, or collectively as the filters 412). The portion of the space segment return link equipment 400A shown in FIG. 4A also includes frequency down-converters (FDCs) 416_1 to 416_500 (which can be referred to individually as a frequency down-converter 416, or collectively as the frequency down-converters 416) and a return link channelizer 415. Exemplary details of the return link channelizer 415, according to an embodiment of the present technology, are described below with reference to FIG. 4B. The return link channelizer 415 is shown as including five hundred input ports and sixty three output ports, but can include alternative numbers of input ports and output ports.

Figure 4B:
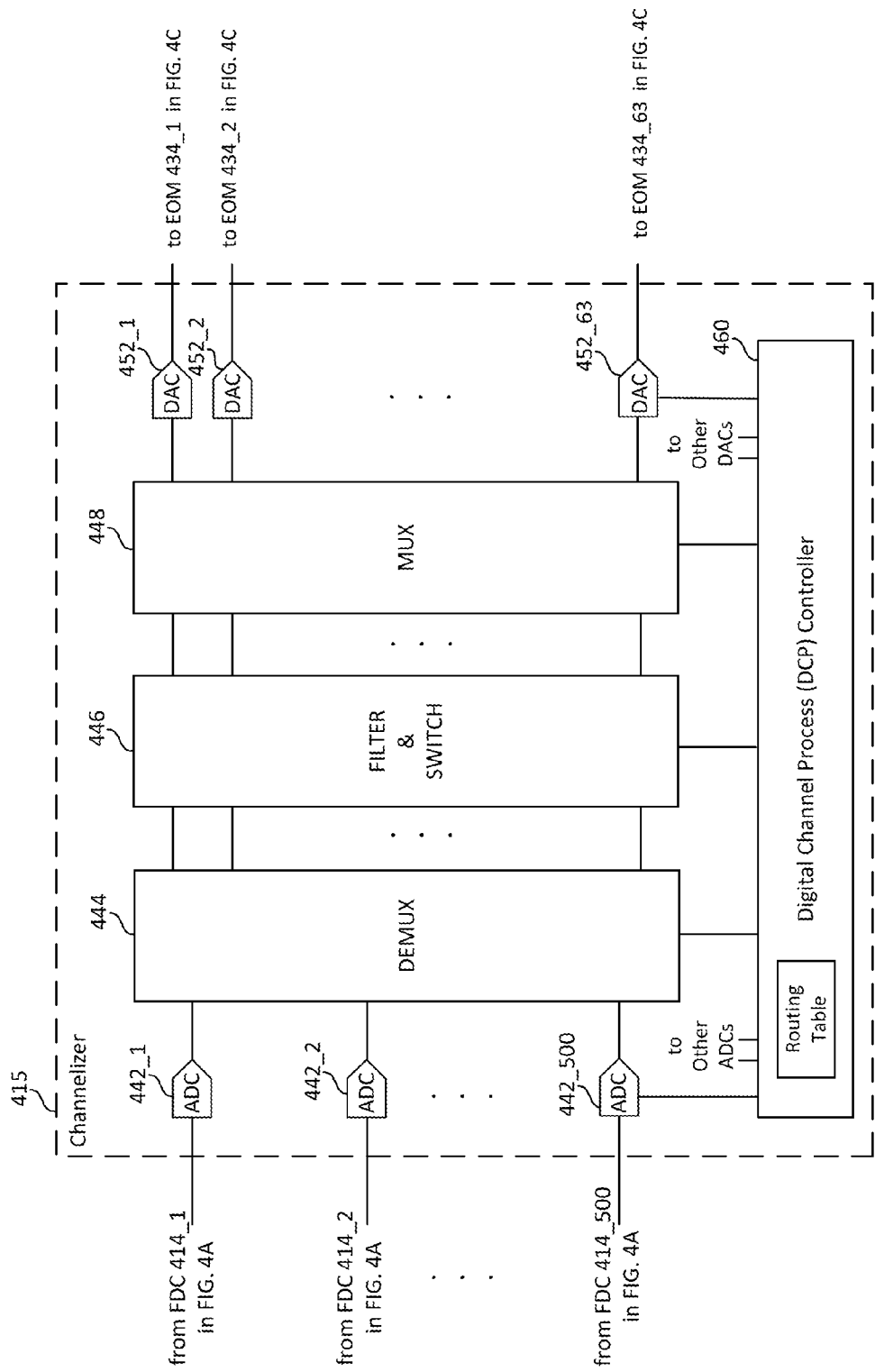
FIG. 4B depicts details of the return link channelizer of the space segment return link equipment introduced in FIG. 4A, according to an embodiment of the present technology.
Figure 4C:
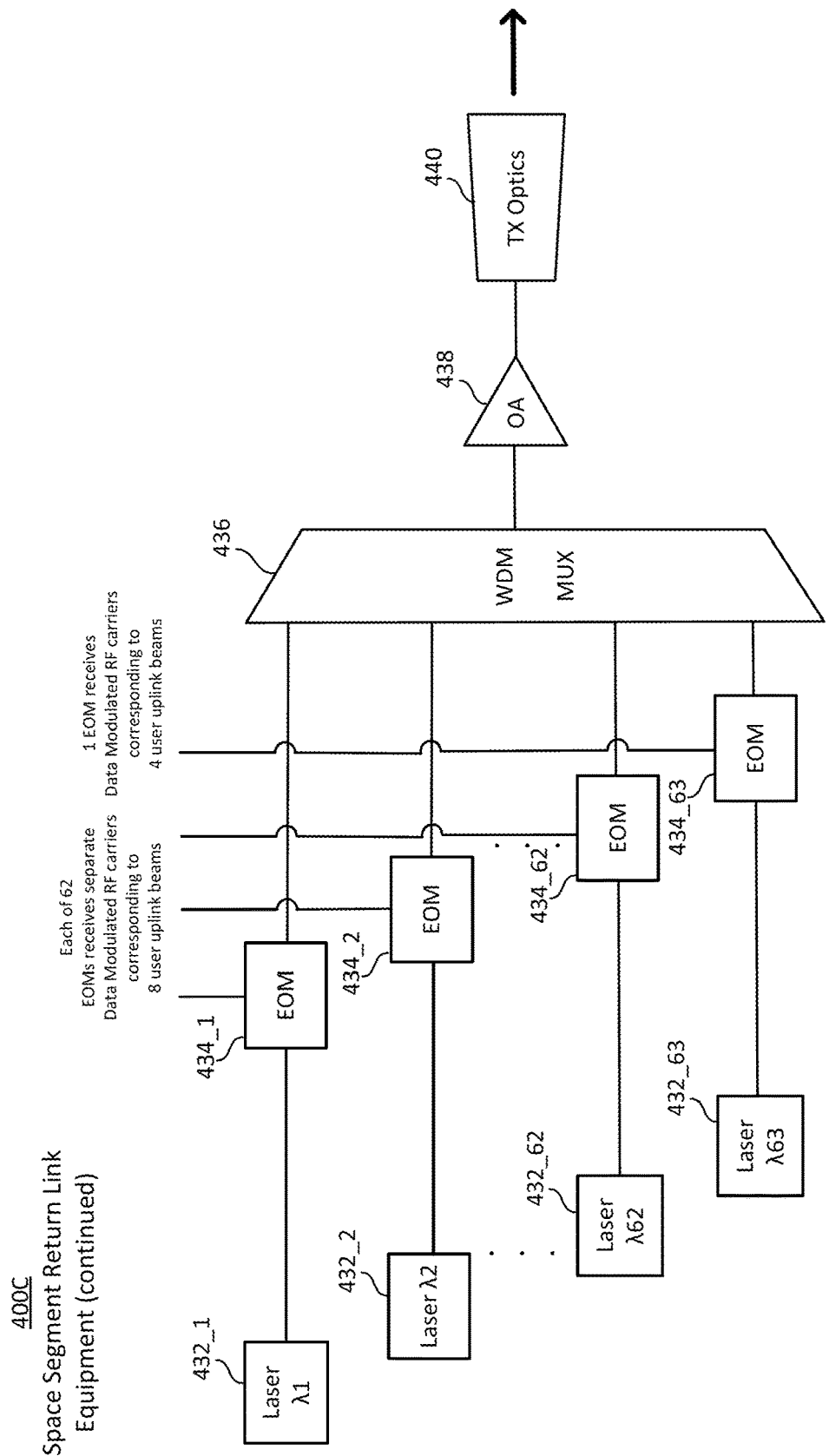
FIG. 4C depicts a further portion of space segment return link equipment introduced in FIG. 4A, according to an embodiment of the present technology.

FIG. 4B will now be used to describe details of the return link channelizer 415, according to an embodiment of the present technology. Referring to FIG. 4B, the return link channelizer 415 is shown as including five hundred analog to digital converters (ADCs) 442_1 to 442_500, a demultiplexer 444, filter and switch circuitry 446, a multiplexer 448, sixty three digital to analog converters (DACs) 452_1 to 452_63. The ADCs 442_1 to 442_500 can be referred to individually as an ADC 442, or collectively as the ADCs 442. The DACs 452_1 to 452_63 can be referred to individually as a DAC 452, or collectively as the DACs 452. The forward link channelizer 415 is also shown as including a digital channel process (DCP) controller 460 that controls the ADCs 442, the demultiplexer 444, the filter and switch circuitry 446, the multiplexer 448 and the DACs 452. The DCP controller 460 can store or otherwise access one or more routing table(s) that are used to control the switching that is performed by the filter and switch circuitry 446. The ADCs 442 digitize the analog RF signals provided to the input ports of the return link channelizer 415 and provides digitized RF signals to the demultiplexer 444. In accordance with certain embodiments, the demultiplexer 444, the filter and switch circuitry 446, and the multiplexer 448, under the control of the DCP controller 460, achieves flexible routing and a high spectral efficiency by changing the frequency and beam allocation in a flexible manner by means of digital signal processing. The demultiplexer 444 decomposes or separates digitized RF signals into sub-channels or sub-bands. The filter and switch circuitry 446 maps the the decomposes sub-channels to arbitrary beams and frequencies. At the multiplexer 448, the signals that were rearranged by the filter and switch circuitry 446 are multiplexed of combined as desired, and then provided to the DACs 452 and then output ports of the return link channelizer 415. Explained another way, the demultiplexer 444, the filter and switch circuitry 446, and the multiplexer 448, under the control of the DCP controller 460, digitally divides each sub-band of the digitized RF signals into frequency slices that can be separated, filtered, switched, processed, routed and/or recombined into RF output signals (in output sub-bands) that are converted to analog RF signals by the DACs 452 and output from the return link channelizer 415. While the exemplary return link channelizer 415 was shown as and described as including five hundred input ports and sixty three output ports, the return link channelizer 415 can have alternative numbers of input ports and output ports. Further, while not specifically shown in FIG. 4B, the return link channelizer 415 can include analog front end circuitry upstream of the ADCs 442 and/or digital back end circuitry downstream of the DACs 452. The filter and switch circuitry 446 of the forward link channelizer 415 can include, e.g., a crossbar switch, a multiple stage switch network, or another switch structure for routing frequency slices as desired. In order to reduce the number of input ports and ADCs 442 included in the return link channelizer 415, combiners (each of which can be implemented by a hybrid, but is not limited thereto) can be included upstream of the return link channelizer 415, e.g., between the FDCs 414 and input ports of the return link channelizer 415, or between the filters 412 and the FDCs 414 (in which case, the number of FDCs 414 can also be reduced).

Referring again to FIG. 4A, each feed horn 402 gathers and focuses radio waves of a service uplink beam (e.g., 106u) and converts them to an RF signal that is provided to a respective OMJ 404. A feed horn 402 and the rest of an antenna can be collectively referred to as the antenna or antenna system. In other words, an antenna, as the term is used herein, can include a feed horn. All or some of the feed horns 402 can share a common reflector. Such reflector(s) is/are not shown in the Figures, to simplify the Figures. Each OMJ 404 either passes through a right hand circular polarization (RHCP) or a left hand circular polarization (LHCP) RF signal. Each OMJ 404 can alternatively pass through either a horizontal or a vertical linear polarization RF signal. Each test coupler TC 406 can be used for power monitoring, payload testing and/or performing calibrations based on signals passing therethrough. Each pre-select filter (PF) 408 (e.g., a bandpass filter) is used to remove unwanted frequency components and/or enhance desired frequency components. For an example, each PF 408 can pass frequencies within the range of 29.5-30.0 GHz, but is not limited thereto. Each LNA 410 amplifies the relatively low-power RF signal it receives from a respective PF 408 without significantly degrading the signals signal-to-noise ratio. The amplified RF signal that is output by each LNA 410 is provided to a respective filter 412.

In accordance with certain embodiments, each filter 412 allows frequencies to pass within one of the colors a, b, c or d. For example, the filter 412_1 passes frequencies within the color a, the filter 412_2 passes the frequencies within the color b, the filter 412_3 passes frequencies within the color c, and the filter 412_4 passes frequencies within the color d. Alternatively, each of the filters 412 can pass frequencies within all of the colors a, b, c, and d, and the channelizer 415 can perform the filtering function. In accordance with an embodiment: color 'a' represents a first sub-band (e.g., 29.50-29.75 GHz) of an allocated uplink frequency band (e.g., 29.50-30.00 GHz) with a right-hand circular polarization (RHCP); color 'b' represents a second sub-band (29.75-30.00 GHz) of the allocated uplink frequency band with RHCP; color 'c' represents the first sub-band (e.g., 29.50-29.75 GHz) of the allocated uplink frequency band with a left-hand circular polarization (LHCP); and color 'd' represents the second sub-band (29.75-30.00 GHz) of the allocated uplink frequency band with LHCP. In other embodiments, the colors may include other allocations of the frequency band and polarization.

In FIG. 4A, each filter 412 is shown as providing its output to a respective frequency down converter (FDC) 414. Each FDC 414 down converts the frequency of the RF signal it receives to an RF signal within the intermediate RF frequency range within which the return link channelizer 415 is configured to operate (e.g., between 1.5 and 2.0 GHz, but not limited thereto). In an alternative embodiment, each pair of the filters 412 can provide their outputs to a combiner (not shown) that functions as a directional coupler that combines two RF signals into one. For example, such a combiner can combine an RF signal having the color a and an RF signal having the color b into a single RF signal that is provided to the frequency down-converter 414_1. Similarly, another combiner (not shown) can combine an RF signal having the color c and an RF signal having the color d into a single RF signal that is provided to the frequency down-converter 416_2. Each such combiner can be implemented by a hybrid, but is not limited thereto.

Each frequency down-converter 414 receives an RF signal from a filter 412 (or a combiner, in which case the RF signal includes data from two service uplink beams, and thus, can be referred to as an RF data signal) and an RF signal from a local oscillator (which can be referred to as an LO signal), and uses the LO signal to down-convert the RF data signal to a frequency range (e.g., 6.70-7.2 GHz, or 6.3-7.2 GHz, or some other frequency range within the 6-12 GHz band) that can be used for transmitting feeder downlink signals (e.g., 102d) to a gateway (e.g., 105). The output of each frequency down-converter 414 is provided to the return link channelizer (or to a combiner, if there are combiners between the FDCs 416 and the input ports of the return link channelizer 415). If desired, frequency up-converters (not shown) can be located downstream of the output ports of the return link channelizer 415.

FIGS. 4A and 4B were used to described portions of space segment return link equipment (400A) that produce a data modulated RF carrier for multiple (e.g., eight) service uplink beams associate with multiple (e.g., eight or more) service terminals STs. FIG. 4C will now be used to describe a further portion of the space segment return link equipment 400C that is used to convert the data modulated RF carrier signals into a collimated optical downlink feeder beam that is aimed at a gateway. Referring to FIG. 4C, the portion of the space segment return link equipment 400C is shown as including sixty three lasers 432_1 to 432_63, sixty three electro-optical modulator (EOMs) 434_1 to 434_63, a wavelength-division multiplexing (WDM) multiplexer (MUX) 436, an optical amplifier (OA) 438 and transmitter optics 440. Each of these elements are described below.

The sixty three separate lasers 432_1 to 432_63 each emit light of a different wavelength within a specified wavelength range. The lasers can be referred to individually as a laser 432, or collectively as the lasers 432. Where the specified wavelength range is, for example, from 1560.2 nm to 1575 nm, then the laser 432_1 may emit light having a peak wavelength of 1560.2 nm, the laser 432_2 may emit light having a peak wavelength of 1560.4 nm, the laser 432_3 (not shown) may emit light having a peak wavelength of 1560.6 nm, . . . the laser 432_62 may emit light having a peak wavelength of 1672.6 nm, and the laser 432_63 may emit light having a peak wavelength of 1672.8 nm. In other words, the peak wavelengths emitted by the lasers 432 can occur at 0.2 nm intervals from 1560.2 nm to 1572.8 nm. The wavelength range from 1560.2 nm to 1575 nm, which is within the IR spectrum, is practical to use because IR lasers for use in communications are readily available. However, wider or narrow wavelength ranges, within the same or other parts of the optical spectrum, may alternatively be used. For example, it would also be possible to utilize a wavelength range within the 400 nm-700 nm visible spectrum. It is also possible that the wavelength range that is specified for use in producing the optical feeder downlink beam (e.g., 102d) is non-contiguous. For example, the wavelength range that is for use in producing the optical feeder downlink beam can be from 1535 nm to 1540 nm and from 1565 nm to 1575 nm. These are just a few examples, which are not intended to be all encompassing. Further, it is also possible that space segment return link equipment can alternatively include more or less than sixty three lasers (that each emit light of a different peak wavelength within a specified contiguous or non-contiguous wavelength range). Additionally, it is noted that the space segment return link equipment may include two or more of each of the lasers (that each emit light of a different peak wavelength within a specified contiguous or non-contiguous wavelength range) to provide for redundancy or backup. Each of the lasers 432 can be, for example, a diode-pumped infrared neodymium laser, although the use of other types of lasers are also within the scope of the embodiments described herein.

In accordance with certain embodiments, the space segment return link equipment 400C includes less lasers (e.g., sixty three lasers 432) for use in generating the optical feeder downlink beam that is aimed from the satellite 100 to the gateway 105, than the gateway forward link equipment 200 includes (e.g., five hundred lasers 202) for generating the optical feeder uplink beam that is aimed from the gateway 105 to the satellite 100. This is made possible due to current asymmetric capacity requirements between the forward and return feeder links. More specifically, a feeder downlink beam (e.g., 102d) carries significantly less data than a feeder uplink beam (e.g., 102u), because service terminals STs typically download much more data than they upload.

On the return link, given the current asymmetric capacity requirements between the forward and return links, the space segment return link equipment can be implemented to handle less demand that the ground based forward link equipment. As an example, if each RF service uplink beam is assumed to have only 320 MHz per beam, then a total of 160 GHz needs to be sent from a satellite to a gateway on the optical feeder downlink beam. Several beams' frequencies can be grouped together to create a 4 GHz bandwidth which is then transmitted on each of sixty three laser wavelengths that are multiplexed together and transmitted to the ground. An alternative implementation would be to aggregate the 4 GHz spectrum with filtering post LNA to eliminate the RF frequency conversion and as above directly modulate the RF spectrum on each of the sixty three laser wavelengths. An alternative implementation would be to use only RF LNAs for each feed, modulate each 320 MHz segment of bandwidth onto a single laser and combine two hundred and fifty laser wavelengths together, thus eliminating the need for RF frequency converters. Depending on the number of service beams and feeder beams required, one or the other configuration can be selected to provide the lowest mass solution.

The light emitted by each of the sixty three lasers 432, which can be referred to as an optical carrier signal, is provided (e.g., via a respective optical fiber) to a respective one of the sixty three separate EOMs 434_1 to 434_63. The EOMs can be referred to individually as an EOM 434, or collectively as the EOMs 434. Each of the EOMs 434 is an optical device in which a signal-controlled element exhibiting an electro-optic effect is used to modulate a respective beam of light. The modulation performed by the EOMs 434 may be imposed on the phase, frequency, amplitude, or polarization of a beam of light, or any combination thereof. In accordance with a specific embodiment, each of the EOMs 434 is a phase modulating EOM that is used as an amplitude modulator by using a Mach-Zehnder interferometer. In other words, each of the EOMs 434 can be implemented as a Mach-Zehnder modulator (MZM), which can be a Lithium Niobate Mach-Zehnder modulator, but is not limited thereto. In accordance with specific embodiments, each of the EOMs 434 is implemented as an MZM that produces an amplitude modulated (AM) optical waveform with a modulation index between 10% and 80% in order to maintain fidelity of an RF waveform (modulated therein) without too much distortion. The optical signal that is output by each of the EOMs 434 can be referred to as an optical data signal. The modulation scheme that is implemented by the EOMs 434 can result in double- or vestigial-sidebands, including both an upper sideband (USB) and a lower sideband (LSB). Alternatively single-sideband modulation (SSB) can be utilized to increase bandwidth and transmission power efficiency.

The sixty three separate optical data signals that are output by the sixty three EOMs 434 are provided to the WDM MUX 436, which can also be referred to as a dense wavelength division multiplexing (DWDM) MUX. The WMD MUX 436 multiplexes (i.e., combines) the sixty three optical data signals, received from the sixty three EOMs 434, onto a single optical fiber, with each of the sixty three separate optical data signals being carried at the same time on its own separate optical wavelength within a specified contiguous wavelength range (e.g., from 1560 nm to 1575 nm) or non-contiguous wavelength range (e.g., from 1510 nm to 1534.8 nm, and from 1540.2 nm to 1564.8 nm). For example, as explained above, the sixty three optical data signals can have peak wavelengths that occur at 0.2 nm intervals from 1560 nm to 1572.8 nm.

The signal that is output by the WMD MUX 436, which can be referred to as a wavelength division multiplexed optical signal, is provided to the optical amplifier (OA) 438. The OA 438 amplifies the wavelength division multiplexed optical signal so that the wavelength division multiplexed optical signal has sufficient power to enable transmission thereof from the satellite 100 in free-space to the gateway 105. The OA 438 can be an erbium-doped fiber amplifier (EDFA), but is not limited thereto. The output of the OA 438 can be referred to as an optically amplified wavelength division multiplexed optical signal.

The optically amplified wavelength division multiplexed optical signal, which is output by the OA 438, is provided (e.g., via an optical fiber) to the transmitter optics 440. The transmitter optics 440, which can also be referred to as a telescope, can includes optical elements such as lenses, mirrors, reflectors, filters and/or the like. The transmitter optics 440 outputs a collimated optical feeder downlink beam that is aimed at a satellite. A gimbal, and/or the like, can be used to control the steering of the transmitter optics 440. In accordance with an embodiment, the collimated optical feeder downlink beam has an aperture of about 40 cm, and a half beam divergence of about 0.0000012 radians, wherein the term "about" as used herein means +/−10 percent of a specified value. The use of other apertures and half beam divergence values are also within the scope of the embodiments described herein. The collimated optical feeder downlink beam, which is output by the transmitter optics 440, is transmitted in free-space to receiver optics in the gateway 105.

A space segment (e.g., a satellite 100) can have different optics that are used for transmitting an optical feeder downlink beam (e.g., 102d) to a gateway, than the optics that are used for receiving an optical feeder uplink beam (e.g., 102u) from a gateway. Alternatively, and preferably, to reduce the weight that needs to be carried by the space segment (e.g., a satellite 100), the same optics can be used for both transmitting an optical feeder downlink beam (e.g., 102d) to a gateway and for receiving an optical feeder uplink beam (e.g., 102u) from a gateway. More specifically, the TX optics 440 shown in FIG. 4C can be the same as the RX optics 302 shown in FIG. 3A. Additional and/or alternative components can be shared between the space segment forward link equipment shown in FIG. 3A and the space segment return link equipment shown in FIGS. 4A, 4B and 4C. For example, the feed horns 326 in FIG. 3A can be the same as the feed horns 402 shown in FIG. 4A. For another example, the OMJs 324 in FIG. 3A can be the same as the OMJs 404 in FIG. 4A, if the OMJs are implement as a three-port device. For another example, one or more components of the forward link channelizer 315 can be shared with the return link channelizer 415, e.g., the same DCP controller can be used for both the forward link and return link channelizers. These are just a few examples, which are not intended to be all encompassing.

Referring again to the EOMs 434 in FIG. 4C, in accordance with certain embodiments of the present technology, each of the EOMs 434 modulates the optical signal it receives (e.g., via an optical fiber from a respective laser 432) with a separate RF signal that has already been modulated to include user data. For example, the EOM 434_1 modulates the optical signal it receives from the laser 431_1 with a data modulated RF carrier signal it receives from the return link channelizer 415. The data modulated RF carrier signal that the EOM 434_1 receives from an output port of the return link channelizer 415 can include data corresponding to eight service uplink beams received from service terminals STs. Similarly, the EOMs 434_2 to 434_62 can each receive a different data modulated RF carrier signal, from a different output port of the return link channelizer 415, with each data modulated RF carrier signal corresponding to a different one or group of service uplink beams received from service terminals STs. In an embodiment, the EOM 434_63 can receive a data modulated RF carrier signal that corresponds to four service uplink beams received from service terminals STs. In this manner, the EOMs 434 can be collectively provided with data modulated RF carrier signals corresponding to five hundred service uplink beams (i.e., 62*8+1*4=500).

Gateway Return Link Equipment

Figure 5:
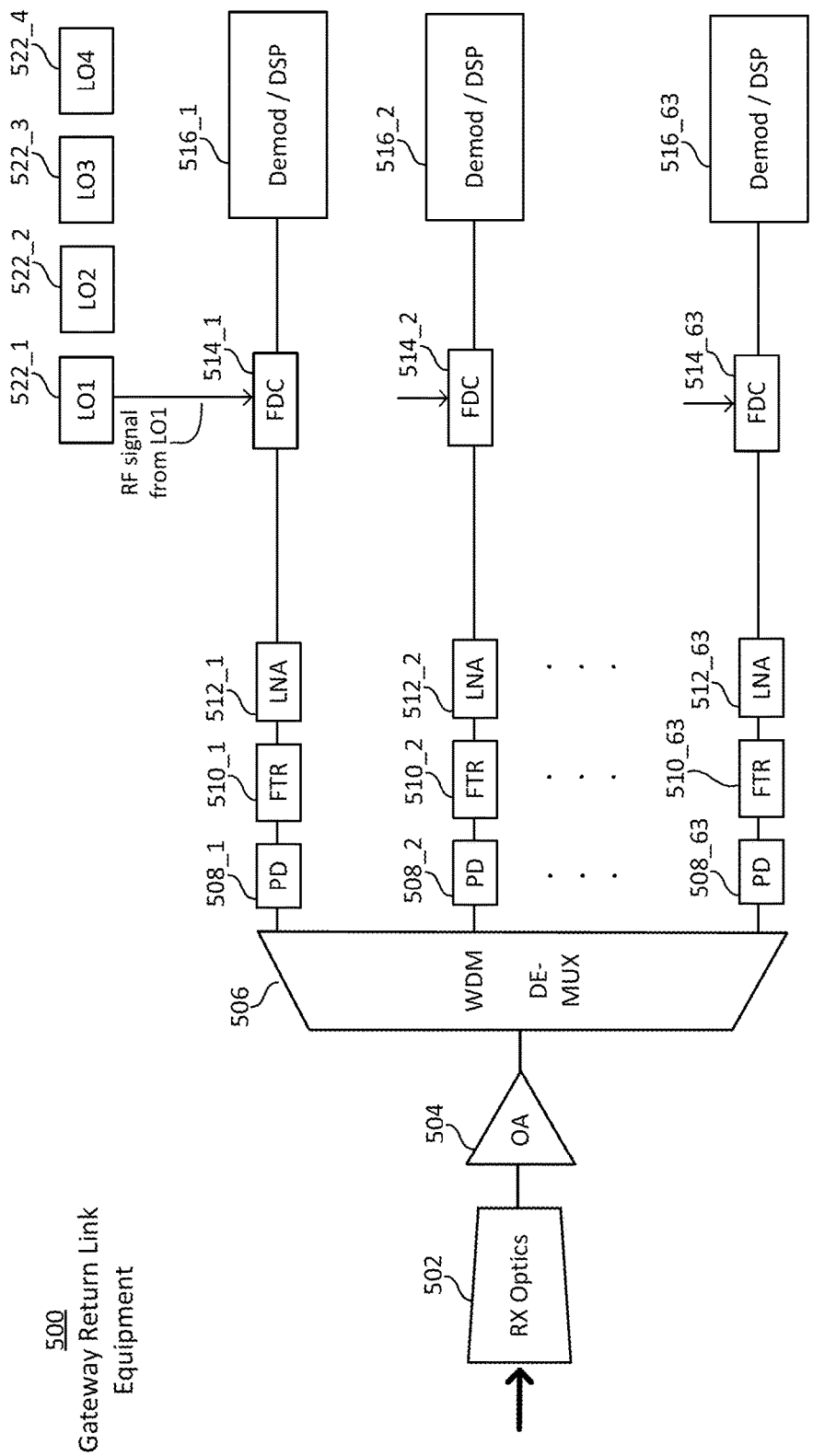
FIG. 5 depicts gateway return link equipment, according to an embodiment of the present technology.

FIG. 5 will now be used to describe gateway return link equipment 500, according to an embodiment of the present technology. Such gateway return link equipment 500 can also be referred to as an optical gateway return link subsystem 500, or more generally, as an optical communication subsystem. Referring to FIG. 5, the optical gateway return link subsystem 500 is shown as including receiver optics 502, an optical amplifier (OA) 504, a wavelength-division multiplexing (WDM) demultiplexer (DEMUX) 506, sixty three photodetectors (PDs) 508_1 to 508_63, sixty three filters 510_1 to 510_63, sixty three low noise amplifiers (LNAs) 512_1 to 512_63, and sixty three frequency down-converters 514_1 to 514_63. The optical gateway return link subsystem 500 is also shown as including sixty three demodulator and digital signal processor (DSP) blocks 516_1 to 516_63, and four local oscillators (LOs) 522_1 to 522_4 (which can be referred to individually as an LO 522, or collectively as the LOs 522).

The receiver optics 502, which can also be referred to as a telescope, can includes optical elements such as mirrors, reflectors, filters and/or the like. The receiver optics 502 receives the optical feeder downlink beam (e.g., 102d) that is transmitted through free-space from a space segment (e.g., a satellite 100), by the space based return link subsystem 400C (or 400A or 400B) and 400D, and provides the received optical feeder downlink beam (e.g., via an optical fiber) to the OA 504. A gimbal, and/or the like, can be used to control the steering of the receiver optics 502. When the optical feeder downlink beam reaches the gateway, the power of the optical feeder downlink beam is significantly attenuated compared to when it was transmitted by the space based return link subsystem. Accordingly, the OA 504 is used to amplify the received optical feeder downlink beam before it is provided to the WDM DEMUX 506. The OA 504 can be, e.g., an erbium-doped fiber amplifier (EDFA), but is not limited thereto. The output of the OA 504 can be referred to as an optically amplified received optical feeder downlink beam. The WDM DEMUX 506 demultiplexes (i.e., separates) the received optical feeder uplink beam (after it has been optically amplified) into sixty three separate optical signals, each of which is provided to a separate photodetector (PD) 508. Each PD 508 converts the optical signal it receives from the WDM DEMUX 506 to a respective RF electrical signal. The RF electrical signal produced by each PD 508 is provided to a respective filter (FTR) 510 (e.g., a bandpass filter) to remove unwanted frequency components and/or enhance desired frequency components. For an example, where frequency down-conversions were performed by FDCs on the satellite (by the space segment return link equipment 400A), each filter 510 can pass frequencies within the range of 1.5 GHz to 2.0 GHz, but are not limited thereto. The filtered RF electrical signal, which is output by each filter 408, is provided to a respective low noise amplifier (LNA) 512. Each LNA 512 amplifies the relatively low-power RF signal it receives from a respective filter 510 without significantly degrading the signals signal-to-noise ratio. The amplified RF signal that is output by each LNA 512 is provided to a respective frequency down-converter 514, the output of which is provided to a respective demodulator and DSP block 516.

Each frequency down-converter 514 receives an RF signal from an LNA 512 (which RF signal includes data from subscriber terminals STs, and thus, can be referred to as an RF data signal) and an RF signal from an LO 452 (which can be referred to as an LO signal), and uses the LO signal to down-convert the RF data signal to baseband. The baseband data signal output by each frequency down-converter 514 is provided to a respective demodulator and DSP block 516. Each demodulator and DSP block 516 demodulates the baseband data signal it receives, and performs digital signal processing thereon. Such a demodulated data signal can be used to provide data to, or request data from, a server, client and/or the like that is coupled to a network (e.g., the network 140 in FIG. 1). If the RF frequency of the signals output by the LNAs 512 are within the frequency range that the demodulation and DSP blocks 516 operate, then the FDCs 514 can be eliminated.

A gateway (e.g., 105) can have different optics that are used for transmitting an optical feeder uplink beam (e.g., 102u) to a space segment (e.g., satellite 100), than the optics that are used for receiving an optical feeder downlink beam (e.g., 102d) from a space segment. Alternatively, a gateway can use the same optics for both transmitting an optical feeder uplink beam (e.g., 102u) to a space segment and for receiving an optical feeder downlink beam (e.g., 102d) from a space segment. More specifically, the RX optics 502 shown in FIG. 5 can be the same as the TX optics 210 shown in FIG. 2A.

Methods

Figure 6:
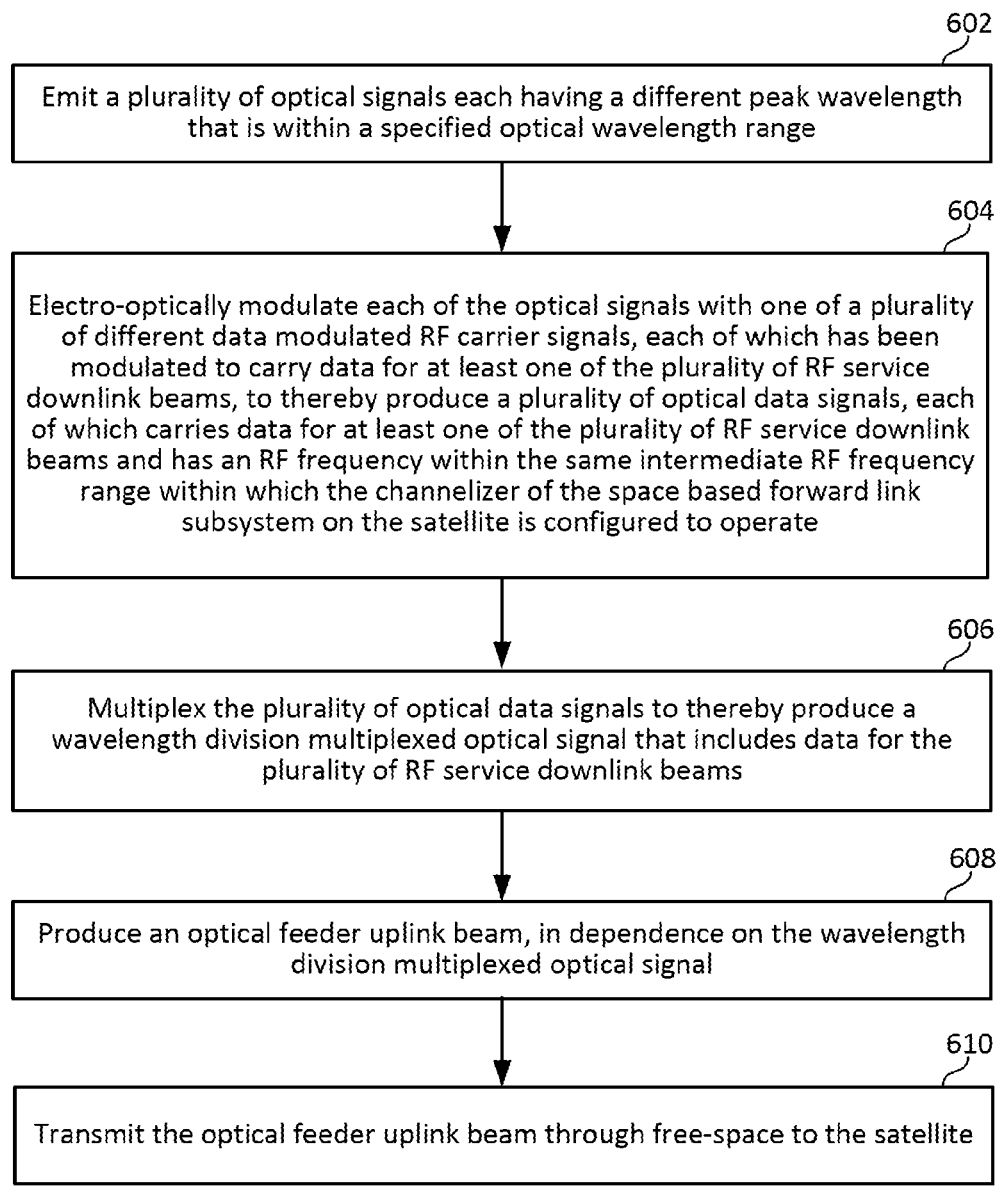
FIG. 6 is a high level flow diagram that is used to summarize methods for enabling a ground based subsystem to produce and transmit an optical feeder uplink beam to a satellite, according to certain embodiments of the present technology.

FIG. 6 will now be used to summarize methods for enabling a ground based subsystem (e.g., the gateway forward link equipment 200 in FIG. 2A) to produce and transmit an optical feeder uplink beam (e.g., 102u in FIG. 1) to a satellite (e.g., 100 in FIG. 1) that is configured to receive the optical feeder uplink beam and in dependence thereon produce and transmit a plurality of RF service downlink beams (e.g., 106d, 110d, 114d and 118d in FIG. 1) within a specified service downlink RF frequency range to service terminals STs, wherein the satellite has a space based forward link subsystem (e.g., 300 in FIG. 3A) including a channelizer (e.g., 315 in FIGS. 3A and 3B) that is configured to operate within an intermediate RF frequency range that is lower than the specified service downlink RF frequency range. In accordance with certain embodiments, the specified RF frequency range within which the satellite is configured to produce and transmit a plurality of RF service downlink beams is a downlink portion of the Ka band. The downlink portion of the Ka band can be from 17.7 GHz to 20.2 GHz, and thus, have a bandwidth of 2.5 GHz. Alternatively, the downlink portion of the Ka band can be from 17.3 GHz to 20.2 GHz, and thus, have a bandwidth of 2.9 GHz. These are just a few examples, which are not intended to be all encompassing.

Referring to FIG. 6, step 602 involves emitting a plurality of optical signals (e.g., two hundred and fifty optical signals) each having a different peak wavelength that is within a specified optical wavelength range. Step 602 can be performed using the lasers 202 discussed above with reference to FIG. 2A. The specified optical wavelength range may be within the C-band and/or L-band optical wavelengths, as explained above. Further, as explained above, the specified optical wavelength range can be a contiguous optical wavelength range within an IR spectrum, or a non-contiguous optical wavelength range within the IR spectrum. As noted above, visible and/or other optical wavelengths may alternatively be used.

Step 604 involves electro-optically modulating each of the optical signals with one of a plurality of different data modulated RF carrier signals, each of which has been modulated to carry data for at least one of the plurality of RF service downlink beams, to thereby produce a plurality of optical data signals, each of which carries data for at least one of the plurality of RF service downlink beams and has an RF frequency within the same intermediate RF frequency range within which the channelizer of the space based forward link subsystem on the satellite is configured to operate. Step 604 can be performed using the EOMs 204 discussed above with reference to FIG. 2A.

Step 606 involves multiplexing the plurality of optical data signals to thereby produce a wavelength division multiplexed optical signal that includes data for the plurality of RF service downlink beams. Step 606 can be performed using the WDM MUX 206 discussed above with reference to FIG. 2A.

Step 608 involves producing an optical feeder uplink beam, in dependence on the wavelength division multiplexed optical signal, and step 610 involves transmitting the optical feeder uplink beam through free-space to the satellite. Steps 608 and 610 can be performed by the transmitter optics 210 discussed above with reference to FIG. 2A. The optical amplifier (OA) 208 discussed above with reference to FIG. 2A can also be used to perform step 608.

Beneficially, because RF frequencies of the optical data signals produced during the electro-optically modulating step 604 are within the same intermediate RF frequency range within which the channelizer of the space based forward link subsystem on the satellite is configured to operate, there is an elimination of any need for the satellite to perform any RF frequency conversions upstream of the channelizer of the space based forward link subsystem on the satellite. In other words, the space segment forward link equipment 300 in FIG. 3A beneficially does not need any frequency down-converters or any other type of frequency conversion equipment upstream of the forward link channelizer 315.

Figure 7:
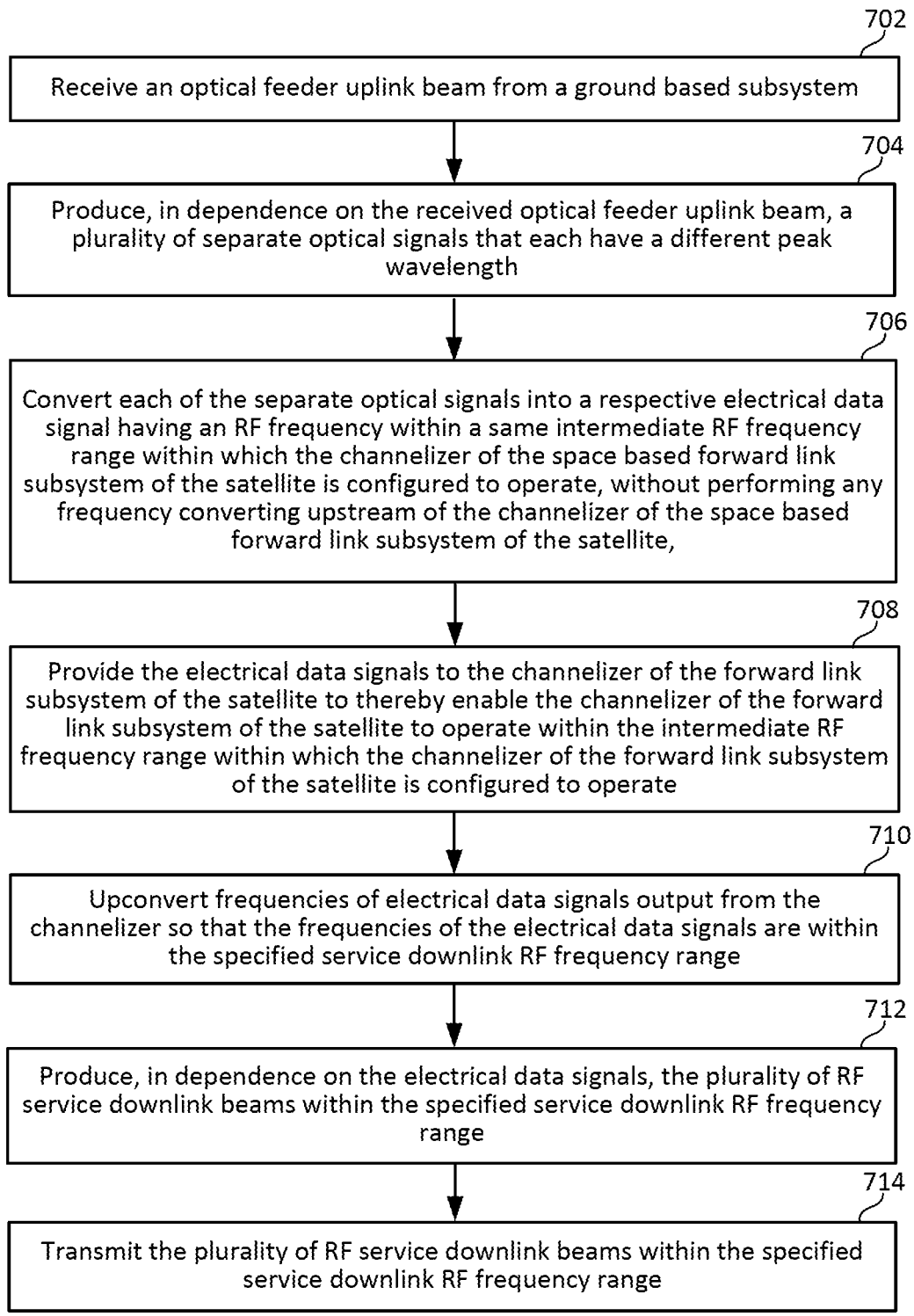
FIG. 7 is a high level flow diagram that is used to summarize methods for enabling a space based subsystem of a satellite to produce and transmit a plurality of RF service downlink beams within a specified RF service downlink frequency range to service terminals, according to certain embodiments of the present technology.

FIG. 7 will now be used to summarize methods for enabling a space based forward link subsystem (e.g., the space segment forward link equipment 300 of FIG. 3) of a satellite (e.g., 100) to produce and transmit a plurality of RF service downlink beams (e.g., 106d, 110d, 114d and 118d in FIG. 1) within a specified service downlink RF frequency range to service terminals, wherein the space based forward link subsystem of the satellite includes a channelizer (e.g., 315 in FIGS. 3A and 3B) that is configured to operate within an intermediate RF frequency range that is lower than the specified service downlink RF frequency range. In accordance with certain embodiments, the specified service downlink RF frequency range within which the satellite is configured to produce and transmit a plurality of RF service downlink beams is a downlink portion of the Ka band. The downlink portion of the Ka band can be from 17.7 GHz to 20.2 GHz, and thus, have a bandwidth of 2.5 GHz. Alternatively, the downlink portion of the Ka band can be from 17.3 GHz to 20.2 GHz, and thus, have a bandwidth of 2.9 GHz. These are just a few examples, which are not intended to be all encompassing.

Referring to FIG. 7, step 702 involves receiving an optical feeder uplink beam (e.g., 102u) from a ground based subsystem (e.g., the gateway forward link equipment 200 in FIG. 2A). Step 702 can be performed by the receiver optics 302 described above with reference to FIG. 3A.

Step 704 involves producing, in dependence on the received optical feeder uplink beam, a plurality of (e.g., two hundred and fifty) separate optical signals that each have a different peak wavelength. Step 704 can be performed by the WDM-DEMUX 306 described above with reference to FIG. 3A.

Step 706, which is performed without performing any frequency converting upstream of the channelizer (e.g., 315 in FIG. 3A) of the space based forward link subsystem of the satellite, involves converting each of the separate optical signals into a respective electrical data signal having an RF frequency within a same intermediate RF frequency range within which the channelizer of the space based forward link subsystem of the satellite is configured to operate. Step 706 can be performed by the PDs 308 discussed above with reference to FIG. 3A.

Step 708 involves providing the electrical data signals to the channelizer of the forward link subsystem of the satellite to thereby enable the channelizer of the forward link subsystem of the satellite to perform one or more of analog to digital conversions, digital signal processing, and digital to analog conversions within the intermediate RF frequency range within which the channelizer of the forward link subsystem of the satellite is configured to operate. Such electrical data signals may first be filtered and amplified by the filters 310 and LNAs 312 discussed above with reference to FIG. 3A.

Step 710 involves upconverting frequencies of electrical data signals output from the channelizer so that the frequencies of the electrical data signals are within the specified service downlink RF frequency range. Step 710 can be performed by the frequency up converters 316 discussed above with reference to FIG. 3A.

Step 712 involves producing, in dependence on the electrical data signals, the plurality of RF service downlink beams within the specified service downlink RF frequency range. Step 712 can be performed, e.g., by the HPAs 318, HFs 320, OMJs 324, and feed horns 326 discussed above with reference to FIG. 3A.

Step 714 involves transmitting the plurality of RF service downlink beams within the specified service downlink RF frequency range. Step 714 can be performed by the feed horns 326 discussed above with reference to FIG. 3, and more generally, antenna systems.

The method summarized with reference to FIG. 7 can additional include using the channelizer of the forward link subsystem of the satellite to digitize RF signals provided to input ports of the channelizer, separate the digitized RF signals into independently routable sub-channels, selectively rearrange and combine the sub-channels, and output at output ports of the channelizer analog RF signals that are used to produce the plurality of RF service downlink beams.

Beneficially, because the RF frequencies of the electrical data signals resulting from the converting step 706 are within the same intermediate RF frequency range within which the channelizer of the space based forward link subsystem on the satellite is configured to operate, there is an elimination of any need for the satellite to perform any RF frequency conversions upstream of the channelizer of the space based forward link subsystem on the satellite. In other words, the space segment forward link equipment 300 in FIG. 3A beneficially does not need any frequency downconverters or any other type of frequency conversion equipment upstream of the forward link channelizer 315.

Further details of the methods described with reference to FIGS. 6 and 7 can be appreciated from the above description of FIGS. 1-5.

Certain embodiments of the present technology described above relate to a ground based subsystem for use in transmitting an optical feeder uplink beam to a satellite that is configured to receive the optical feeder uplink beam and in dependence thereon produce and transmit a plurality of RF service downlink beams within a specified service downlink RF frequency range to service terminals, wherein the satellite has a space based forward link subsystem including a channelizer that is configured to operate within an intermediate RF frequency range that is lower than the specified service downlink RF frequency range. The ground based subsystem can include a plurality of lasers, a plurality of electro-optical modulators (EOMs), a wavelength-division multiplexing (WDM), an optical amplifier, and transmitter optics. Each of the lasers is operable to emit an optical signal having a different peak wavelength within a specified optical wavelength range. The specified optical wavelength range can be a contiguous or non-contiguous optical wavelength range within an infrared (IR) spectrum, but is not limited thereto. Each of the EOMs is configured to receive an optical signal from a respective one of the plurality of lasers, receive a different data modulated RF carrier signal that has been modulated to carry data for at least one of the plurality of RF service downlink beams, and output an optical data signal carrying data for at least one of the plurality of RF service downlink beams and having an RF frequency within the same intermediate RF frequency range within which the channelizer of the space based forward link subsystem on the satellite is configured to operate. The WDM multiplexer is configured to receive the optical data signals output by the plurality of EOMs, and combine the plurality of optical data signals into a wavelength division multiplexed optical signal. The optical amplifier is configured to amplify the wavelength division multiplexed optical signal to thereby produce an optically amplified wavelength division multiplexed optical signal. The transmitter optics is configured to receive the optically amplified wavelength division multiplexed optical signal and transmit an optical feeder uplink beam to the satellite in dependence thereon. In accordance with certain embodiments, because the RF frequencies of the optical data signals output by the plurality of EOMs are within the same intermediate RF frequency range within which the channelizer of the space based forward link subsystem on the satellite is configured to operate, there is an elimination of any need for the satellite to perform any RF frequency conversions upstream of the channelizer of the space based forward link subsystem on the satellite. This beneficially reduces equipment on and complexity of the satellite.

In accordance with certain embodiments, the specified service downlink RF frequency range within which the satellite is configured to produce and transmit the plurality of RF service downlink beams is a downlink portion of the Ka band, and the intermediate RF frequency range within which the channelizer of the space based forward link subsystem on the satellite is configured to operate is lower than the downlink portion of the Ka band. The the downlink portion of the Ka band can be from 17.7 GHz to 20.2 GHz, and thus, has a bandwidth of 2.5 GHz. Alternatively, the downlink portion of the Ka band can be from 17.3 GHz to 20.2 GHz, and thus, has a bandwidth of 2.9 GHz. Other downlink frequency bands are also possible and within embodiments of the present technology. The intermediate RF frequency can be, e.g., 1.5 GHz to 2.0 GHz, but is not limited thereto.

In accordance with certain embodiments, the ground based subsystem can also include a plurality of RF modulators configured to produce the data modulated RF carrier signals that are received by the plurality of EOMs, wherein each of the RF modulators receives an RF carrier signal having an RF frequency within the same intermediate RF frequency range within which the channelizer on the satellite is configured to operate. The ground based subsystem can also include one or more oscillators configured to produce the RF carrier signals that are provided to the RF modulators, wherein each of the RF carriers signals has an RF frequency within the same intermediate RF frequency range within which the channelizer of the space based forward link subsystem on the satellite is configured to operate.

Certain embodiments of the present technology described above relate to methods for enabling a ground based subsystem to produce and transmit an optical feeder uplink beam to a satellite that is configured to receive the optical feeder uplink beam and in dependence thereon produce and transmit a plurality of RF service downlink beams within a specified service downlink RF frequency range to service terminals, wherein the satellite has a space based forward link subsystem including a channelizer that is configured to operate within an intermediate RF frequency range that is lower than the specified service downlink RF frequency range. Such a method can include emitting a plurality of optical signals each having a different peak wavelength that is within a specified optical wavelength range. The method can also include electro-optically modulating each of the optical signals with one of a plurality of different data modulated RF carrier signals, each of which has been modulated to carry data for at least one of the plurality of RF service downlink beams, to thereby produce a plurality of optical data signals, each of which carries data for at least one of the plurality of RF service downlink beams and has an RF frequency within the same intermediate RF frequency range within which the channelizer of the space based forward link subsystem on the satellite is configured to operate. The method can further include multiplexing the plurality of optical data signals to thereby produce a wavelength division multiplexed optical signal that includes data for the plurality of RF service downlink beams. Additionally, the method can include producing an optical feeder uplink beam, in dependence on the wavelength division multiplexed optical signal, and transmitting the optical feeder uplink beam through free-space to the satellite. In accordance with certain embodiments, because RF frequencies of the optical data signals produced during the electro-optically modulating are within the same intermediate RF frequency range within which the channelizer of the space based forward link subsystem on the satellite is configured to operate, there is an elimination of any need for the satellite to perform any RF frequency conversions upstream of the channelizer of the space based forward link subsystem on the satellite. The method can also include receiving a plurality of RF carrier signals each of which has a different RF frequency within the same intermediate RF frequency range within which the channelizer of the space based forward link subsystem on the satellite is configured to operate, and producing the data modulated RF carrier signals, which are electro-optically modulated with the optical signals, in dependence on the plurality of RF carrier signals. In accordance with certain embodiments, the specified service downlink RF frequency range within which the satellite is configured to produce and transmit the plurality of RF service downlink beams is within a downlink portion of the Ka band, wherein the intermediate RF frequency range within which the channelizer of the space based forward link subsystem on the satellite is configured to operate is lower than the downlink portion of the Ka band.

Certain embodiments of the present technology described above relate to space based forward link subsystem of a satellite for use in transmitting a plurality of RF service downlink beams within a specified downlink RF frequency range to service terminals. The space based forward link subsystem can include receiver optics, an optical amplifier, a wavelength-division multiplexing (WDM), a plurality of photodetectors, a channelizer, frequency upconverters, and RF components and antennas downstream of the frequency upconverters. The receiver optics are configured to receive an optical feeder uplink beam from a ground based subsystem. The optical amplifier is optically coupled to the receiver optics and configured to amplify an optical feeder uplink signal that is output from the receiver optics. The WDM demultiplexer is optically coupled to the optical amplifier and configured to separate the amplified optical feeder uplink signal, which is output from the optical amplifier, into a plurality of separate optical signals that each have a different peak wavelength. The plurality of photodetectors, which are upstream of the channelizer of the space based forward link subsystem, are each operable to convert a different one of the optical signals that are output from the WDM demultiplexer, to a respective electrical data signal having an RF frequency within the same intermediate RF frequency range within which the channelizer of the space based forward link subsystem is configured operate. The channelizer of the space based forward link subsystem including a plurality of input ports, a plurality of output ports, and circuitry therebetween configured to operate within an intermediate RF frequency range that is lower than the specified downlink RF frequency range. The input ports of the channelizer receive the electrical data signals produced by the photodetectors, which are optionally filtered and/or amplified before being provided to the input ports. The frequency upconverters, which are downstream of the output ports of the channelizer of the space based forward link subsystem, are configured to convert frequencies of signals output by the channelizer from being within the intermediate RF frequency range to being within the specified downlink RF frequency range. RF components and antennas downstream of the frequency upconverters are configured to produce and transmit the plurality of RF service downlink beams within the specified downlink RF frequency range. In accordance with certain embodiments, because the RF frequencies of the electrical data signals output by the plurality of photodetectors are within the same intermediate RF frequency range within which the channelizer of the space based forward link subsystem is configured to operate, there is an elimination of any need for the space based forward link subsystem to perform any RF frequency conversions upstream of the channelizer of the space based forward link subsystem. This beneficially reduces equipment on and complexity of the satellite. In accordance with certain embodiments, the channelizer of the forward link subsystem of the satellite is configured to digitize RF signals provided to input ports of the channelizer, separate the digitized RF signals into independently routable sub-channels, selectively rearrange and combine the sub-channels, and output at output ports of the channelizer analog RF signals that are used to produce the plurality of RF service downlink beams.

In accordance with certain embodiments, the specified service downlink RF frequency range within which the satellite is configured to produce and transmit the plurality of RF service downlink beams comprises a downlink portion of the Ka band, and the intermediate RF frequency range within which the channelizer of the space based forward link subsystem is configured to operate is lower than the downlink portion of the Ka band.

Certain embodiments of the present technology described above relate to methods for enabling a space based forward link subsystem of a satellite to produce and transmit a plurality of RF service downlink beams within a specified service downlink RF frequency range to service terminals, wherein the space based forward link subsystem of the satellite includes a channelizer that is configured to operate within an intermediate RF frequency range that is lower than the specified service downlink RF frequency range. Such a method can include receiving an optical feeder uplink beam from a ground based subsystem. The method can also include producing, in dependence on the received optical feeder uplink beam, a plurality of separate optical signals that each have a different peak wavelength. In accordance with certain embodiments, the method also include converting each of the separate optical signals into a respective electrical data signal having an RF frequency within a same intermediate RF frequency range within which the channelizer of the space based forward link subsystem of the satellite is configured to operate, without performing any frequency converting upstream of the channelizer of the space based forward link subsystem of the satellite. The method can also include providing the electrical data signals to the channelizer of the forward link subsystem of the satellite to thereby enable the channelizer of the forward link subsystem of the satellite to operate within the intermediate RF frequency range within which the channelizer of the forward link subsystem of the satellite is configured to operate. Additionally, the method can include upconverting frequencies of electrical data signals output from the channelizer so that the frequencies of the electrical data signals are within the specified service downlink RF frequency range. Further, the method can include producing, in dependence on the electrical data signals, the plurality of RF service downlink beams within the specified service downlink RF frequency range, transmitting the plurality of RF service downlink beams within the specified service downlink RF frequency range. In accordance with certain embodiments, the specified service downlink RF frequency range within which the satellite is configured to produce and transmit the plurality of RF service downlink beams comprises a downlink portion of the Ka band, and the intermediate RF frequency range within which the channelizer of the space based forward link subsystem of the satellite is configured to operate is lower than the downlink portion of the Ka band.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. A ground based subsystem for use in transmitting an optical feeder uplink beam to a satellite that is configured to receive the optical feeder uplink beam and in dependence thereon produce and transmit a plurality of RF service downlink beams within a specified service downlink RF frequency range to service terminals, wherein the satellite comprises a space based forward link subsystem including a channelizer that is configured to operate within an intermediate RF frequency range that is lower than the specified service downlink RF frequency range, the ground based subsystem comprising:
a plurality of lasers, each of the lasers operable to emit an optical signal having a different peak wavelength within a specified optical wavelength range;
a plurality of electro-optical modulators (EOMs), each of the EOMs configured to receive an optical signal from a respective one of the plurality of lasers, receive a different data modulated RF carrier signal that has been modulated to carry data for at least one of the plurality of RF service downlink beams, and output an optical data signal carrying data for at least one of the plurality of RF service downlink beams and having an RF frequency within the same intermediate RF frequency range within which the channelizer of the space based forward link subsystem on the satellite is configured to operate;
a wavelength-division multiplexing (WDM) multiplexer configured to receive the optical data signals output by the plurality of EOMs, and combine the plurality of optical data signals into a wavelength division multiplexed optical signal;
an optical amplifier configured to amplify the wavelength division multiplexed optical signal to thereby produce an optically amplified wavelength division multiplexed optical signal; and
transmitter optics configured to receive the optically amplified wavelength division multiplexed optical signal and transmit an optical feeder uplink beam to the satellite in dependence thereon;
wherein because the RF frequencies of the optical data signals output by the plurality of EOMs are within the same intermediate RF frequency range within which the channelizer of the space based forward link subsystem on the satellite is configured to operate, there is an elimination of any need for the satellite to perform any RF frequency conversions upstream of the channelizer of the space based forward link subsystem on the satellite.

2. The subsystem of claim 1, wherein:
the specified service downlink RF frequency range within which the satellite is configured to produce and transmit the plurality of RF service downlink beams comprises a downlink portion of the Ka band; and
the intermediate RF frequency range within which the channelizer of the space based forward link subsystem on the satellite is configured to operate is lower than the downlink portion of the Ka band.

3. The subsystem of claim 2, wherein:
the downlink portion of the Ka band is from 17.7 GHz to 20.2 GHz, and thus, has a bandwidth of 2.5 GHz; or
the downlink portion of the Ka band is from 17.3 GHz to 20.2 GHz, and thus, has a bandwidth of 2.9 GHz.

4. The subsystem of claim 1, further comprising:
a plurality of RF modulators configured to produce the data modulated RF carrier signals that are received by the plurality of EOMs;
wherein each of the RF modulators receives an RF carrier signal having an RF frequency within the same intermediate RF frequency range within which the channelizer of the space based forward link subsystem on the satellite is configured to operate.

5. The subsystem of claim 4, further comprising:
one or more oscillators configured to produce the RF carrier signals that are provided to the RF modulators, each of the RF carriers signals having an RF frequency within the same intermediate RF frequency range within which the channelizer of the space based forward link subsystem on the satellite is configured to operate.

6. The subsystem of claim 1, wherein the specified optical wavelength range is a contiguous or non-contiguous optical wavelength range within an infrared (IR) spectrum.

7. A method for enabling a ground based subsystem to produce and transmit an optical feeder uplink beam to a satellite that is configured to receive the optical feeder uplink beam and in dependence thereon produce and transmit a plurality of RF service downlink beams within a specified service downlink RF frequency range to service terminals, wherein the satellite comprises a space based forward link subsystem including a channelizer that is configured to operate within an intermediate RF frequency range that is lower than the specified service downlink RF frequency range, the method for use by the ground based subsystem comprising:
emitting a plurality of optical signals each having a different peak wavelength that is within a specified optical wavelength range;
electro-optically modulating each of the optical signals with one of a plurality of different data modulated RF carrier signals, each of which has been modulated to carry data for at least one of the plurality of RF service downlink beams, to thereby produce a plurality of optical data signals, each of which carries data for at least one of the plurality of RF service downlink beams and has an RF frequency within the same intermediate RF frequency range within which the channelizer of the space based forward link subsystem on the satellite is configured to operate;

multiplexing the plurality of optical data signals to thereby produce a wavelength division multiplexed optical signal that includes data for the plurality of RF service downlink beams;

producing an optical feeder uplink beam, in dependence on the wavelength division multiplexed optical signal; and transmitting the optical feeder uplink beam through free-space to the satellite;

wherein because RF frequencies of the optical data signals produced during the electro-optically modulating are within the same intermediate RF frequency range within which the channelizer of the space based forward link subsystem on the satellite is configured to operate, there is an elimination of any need for the satellite to perform any RF frequency conversions upstream of the channelizer of the space based forward link subsystem on the satellite.

8. The method of claim 7, further comprising:

receiving a plurality of RF carrier signals each of which has a different RF frequency within the same intermediate RF frequency range within which the channelizer of the space based forward link subsystem on the satellite is configured to operate; and producing the data modulated RF carrier signals, which are electro-optically modulated with the optical signals, in dependence on the plurality of RF carrier signals.

9. The method of claim 7, wherein:

the specified service downlink RF frequency range within which the satellite is configured to produce and transmit the plurality of RF service downlink beams comprises a downlink portion of the Ka band; and the intermediate RF frequency range within which the channelizer of the space based forward link subsystem on the satellite is configured to operate is lower than the downlink portion of the Ka band.

10. The method of claim 9, wherein:

the downlink portion of the Ka band is from 17.7 GHz to 20.2 GHz, and thus, has a bandwidth of 2.5 GHz; or the downlink portion of the Ka band is from 17.3 GHz to 20.2 GHz, and thus, has a bandwidth of 2.9 GHz.

11. A space based forward link subsystem of a satellite for use in transmitting a plurality of RF service downlink beams within a specified downlink RF frequency range to service terminals, the space based forward link subsystem comprising:

receiver optics configured to receive an optical feeder uplink beam from a ground based subsystem;

an optical amplifier optically coupled to the receiver optics and configured to amplify an optical feeder uplink signal that is output from the receiver optics;

a wavelength-division multiplexing (WDM) demultiplexer optically coupled to the optical amplifier and configured to separate the amplified optical feeder uplink signal, which is output from the optical amplifier, into a plurality of separate optical signals that each have a different peak wavelength; and a plurality of photodetectors upstream of a channelizer of the space based forward link subsystem;

each of the photodetectors operable to convert a different one of the optical signals that are output from the WDM demultiplexer, to a respective electrical data signal having an RF frequency within the same intermediate RF frequency range within which the channelizer of the space based forward link subsystem is configured operate;

the channelizer of the space based forward link subsystem including a plurality of input ports, a plurality of output ports, and circuitry therebetween configured to operate within an intermediate RF frequency range that is lower than the specified downlink RF frequency range, the input ports receiving the electrical data signals produced by the photodetectors, which are optionally filtered and/or amplified before being provided to the input ports;

frequency upconverters downstream of the output ports of the channelizer of the space based forward link subsystem and configured to convert frequencies of signals output by the channelizer from being within the intermediate RF frequency range to being within the specified downlink RF frequency range; and RF components and antennas downstream of the frequency upconverters and configured to produce and transmit the plurality of RF service downlink beams within the specified downlink RF frequency range;

wherein because the RF frequencies of the electrical data signals output by the plurality of photodetectors are within the same intermediate RF frequency range within which the channelizer of the space based forward link subsystem is configured to operate, there is an elimination of any need for the space based forward link subsystem to perform any RF frequency conversions upstream of the channelizer of the space based forward link subsystem.

12. The subsystem of claim 11, wherein:

the specified service downlink RF frequency range within which the satellite is configured to produce and transmit the plurality of RF service downlink beams comprises a downlink portion of the Ka band; and the intermediate RF frequency range within which the channelizer of the space based forward link subsystem is configured to operate is lower than the downlink portion of the Ka band.

13. The subsystem of claim 12, wherein:

the downlink portion of the Ka band is from 17.7 GHz to 20.2 GHz, and thus, has a bandwidth of 2.5 GHz; or the downlink portion of the Ka band is from 17.3 GHz to 20.2 GHz, and thus, has a bandwidth of 2.9 GHz.

14. The subsystem of claim 11, wherein the specified optical wavelength range is a contiguous or non-contiguous optical wavelength range within an infrared (IR) spectrum.

15. The subsystem of claim 11, wherein the channelizer of the forward link subsystem of the satellite is configured to digitize RF signals provided to input ports of the channelizer, separate the digitized RF signals into independently routable sub-channels, selectively rearrange and combine the sub-channels, and output at output ports of the channelizer analog RF signals that are used to produce the plurality of RF service downlink beams.

16. A method for enabling a space based forward link subsystem of a satellite to produce and transmit a plurality of RF service downlink beams within a specified service downlink RF frequency range to service terminals, wherein the space based forward link subsystem of the satellite includes a channelizer that is configured to operate within an intermediate RF frequency range that is lower than the specified service downlink RF frequency range, the method for use by the space based forward link subsystem comprising:

receiving an optical feeder uplink beam from a ground based subsystem;

producing, in dependence on the received optical feeder uplink beam, a plurality of separate optical signals that each have a different peak wavelength;

without performing any frequency converting upstream of the channelizer of the space based forward link subsystem of the satellite, converting each of the separate optical signals into a respective electrical data signal having an RF frequency within a same intermediate RF frequency range within which the channelizer of the space based forward link subsystem of the satellite is configured to operate;

providing the electrical data signals to the channelizer of the forward link subsystem of the satellite to thereby enable the channelizer of the forward link subsystem of the satellite to perform one or more of analog to digital conversions, digital signal processing, and digital to analog conversions within the intermediate RF frequency range within which the channelizer of the forward link subsystem of the satellite is configured to operate;

upconverting frequencies of electrical data signals output from the channelizer so that the frequencies of the electrical data signals are within the specified service downlink RF frequency range;

producing, in dependence on the frequency upconverted electrical data signals, the plurality of RF service downlink beams within the specified service downlink RF frequency range; and transmitting the plurality of RF service downlink beams within the specified service downlink RF frequency range.

17. The method of claim 16, wherein:

the specified service downlink RF frequency range within which the satellite is configured to produce and transmit the plurality of RF service downlink beams comprises a downlink portion of the Ka band; and the intermediate RF frequency range within which the channelizer of the space based forward link subsystem of the satellite is configured to operate is lower than the downlink portion of the Ka band.

18. The method of claim 17, wherein:

the downlink portion of the Ka band is from 17.7 GHz to 20.2 GHz, and thus, has a bandwidth of 2.5 GHz; or the downlink portion of the Ka band is from 17.3 GHz to 20.2 GHz, and thus, has a bandwidth of 2.9 GHz.

19. The method of claim 16, wherein the specified optical wavelength range is a contiguous or non-contiguous optical wavelength range within an infrared (IR) spectrum.

20. The method of claim 16, further comprising using the channelizer of the forward link subsystem of the satellite to digitize RF signals provided to input ports of the channelizer, separate the digitized RF signals into independently routable sub-channels, selectively rearrange and combine the sub-channels, and output at output ports of the channelizer analog RF signals that are used to produce the plurality of RF service downlink beams.

* * * * *